United States Patent
Barry et al.

(10) Patent No.: US 9,158,547 B2
(45) Date of Patent: *Oct. 13, 2015

(54) METHODS AND APPARATUS FOR SCALABLE ARRAY PROCESSOR INTERRUPT DETECTION AND RESPONSE

(71) Applicants: Edwin Franklin Barry, Vilas, NC (US); Patrick R. Marchand, Apex, NC (US); Gerald George Pechanek, Cary, NC (US); Larry D. Larsen, Raleigh, NC (US)

(72) Inventors: Edwin Franklin Barry, Vilas, NC (US); Patrick R. Marchand, Apex, NC (US); Gerald George Pechanek, Cary, NC (US); Larry D. Larsen, Raleigh, NC (US)

(73) Assignee: Altera Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/264,263

(22) Filed: Apr. 29, 2014

(65) Prior Publication Data
US 2014/0237215 A1    Aug. 21, 2014

Related U.S. Application Data

(60) Continuation of application No. 13/916,877, filed on Jun. 13, 2013, now Pat. No. 8,751,772, which is a continuation of application No. 13/417,490, filed on Mar. 12, 2012, now Pat. No. 8,489,858, which is a division of application No. 12/956,316, filed on Nov. 30, 2010, now Pat. No. 8,161,267, which is a division of application No. 12/120,543, filed on May 14, 2008, now Pat. No. 7,853,779, which is a division of application No. 10/931,751, filed on Sep. 1, 2004, now Pat. No. 7,386,710, which is a division of application No. 09/791,256, filed on Feb. 23, 2001, now Pat. No. 6,842,811.

(60) Provisional application No. 60/184,529, filed on Feb. 24, 2000.

(51) Int. Cl.
| | |
|---|---|
| *G06F 9/38* | (2006.01) |
| *G06F 9/48* | (2006.01) |
| *G06F 13/26* | (2006.01) |
| *G06F 9/30* | (2006.01) |
| *G06F 11/27* | (2006.01) |

(52) U.S. Cl.
CPC ........ *G06F 9/3865* (2013.01); *G06F 9/30058* (2013.01); *G06F 9/3861* (2013.01); *G06F 9/4812* (2013.01); *G06F 11/27* (2013.01); *G06F 13/26* (2013.01); *Y02B 60/1228* (2013.01); *Y02B 60/144* (2013.01)

(58) Field of Classification Search
None
See application file for complete search history.

(56) References Cited

U.S. PATENT DOCUMENTS

| | | | | |
|---|---|---|---|---|
| 5,144,692 | A * | 9/1992 | Baker et al. | 710/240 |
| 5,347,639 | A * | 9/1994 | Rechtschaffen et al. | 712/203 |
| 5,384,906 | A * | 1/1995 | Horst | 713/375 |
| 6,405,305 | B1 * | 6/2002 | Meier et al. | 712/222 |
| 6,591,360 | B1 * | 7/2003 | Soltis et al. | 712/219 |

* cited by examiner

*Primary Examiner* — Eric Coleman
(74) *Attorney, Agent, or Firm* — Law Offices of Peter H. Priest, PLLC

(57) ABSTRACT

Hardware and software techniques for interrupt detection and response in a scalable pipelined array processor environment are described. Utilizing these techniques, a sequential program execution model with interrupts can be maintained in a highly parallel scalable pipelined array processing containing multiple processing elements and distributed memories and register files. When an interrupt occurs, interface signals are provided to all PEs to support independent interrupt operations in each PE dependent upon the local PE instruction sequence prior to the interrupt. Processing/element exception interrupts are supported and low latency interrupt processing is also provided for embedded systems where real time signal processing is required. Further, a hierarchical interrupt structure is used allowing a generalized debug approach using debut interrupts and a dynamic debut monitor mechanism.

20 Claims, 20 Drawing Sheets

*FIG. 2A*

SYSCALL-SYSTEM CALL ENCODING — 202

| 31 30 29 | 28 27 26 25 | 24 23 22 | 21 20 19 18 17 | 16 15 14 13 12 11 10 9 8 7 6 5 | 4 3 2 1 0 |
|---|---|---|---|---|---|
| Group | S/P CtrlOp | 0 0 0 | CtrlCC | 0 0 0 0 0 0 0 0 0 0 0 0 | Vector |

— 204

Syntax/Operation

| Instruction | Operands | Operation |
|---|---|---|
| SYSCALL | Vector | GPISR ← SCR0<br>GPILR ← PC + 1<br>PC ← SysVecTbl[Vector]$_{word}$<br>SCR0.GPIE ← 0 |

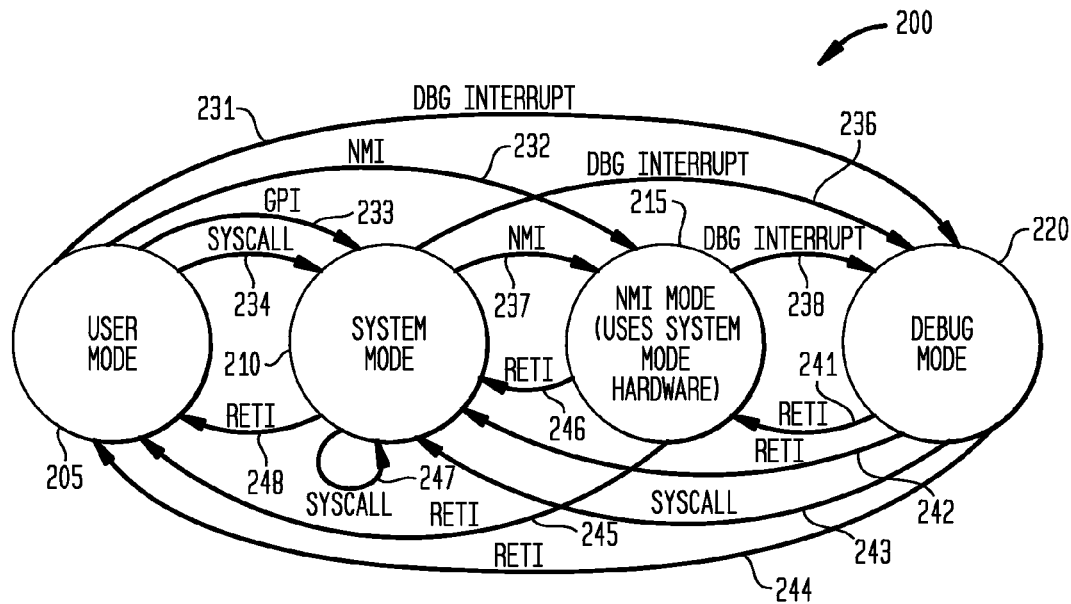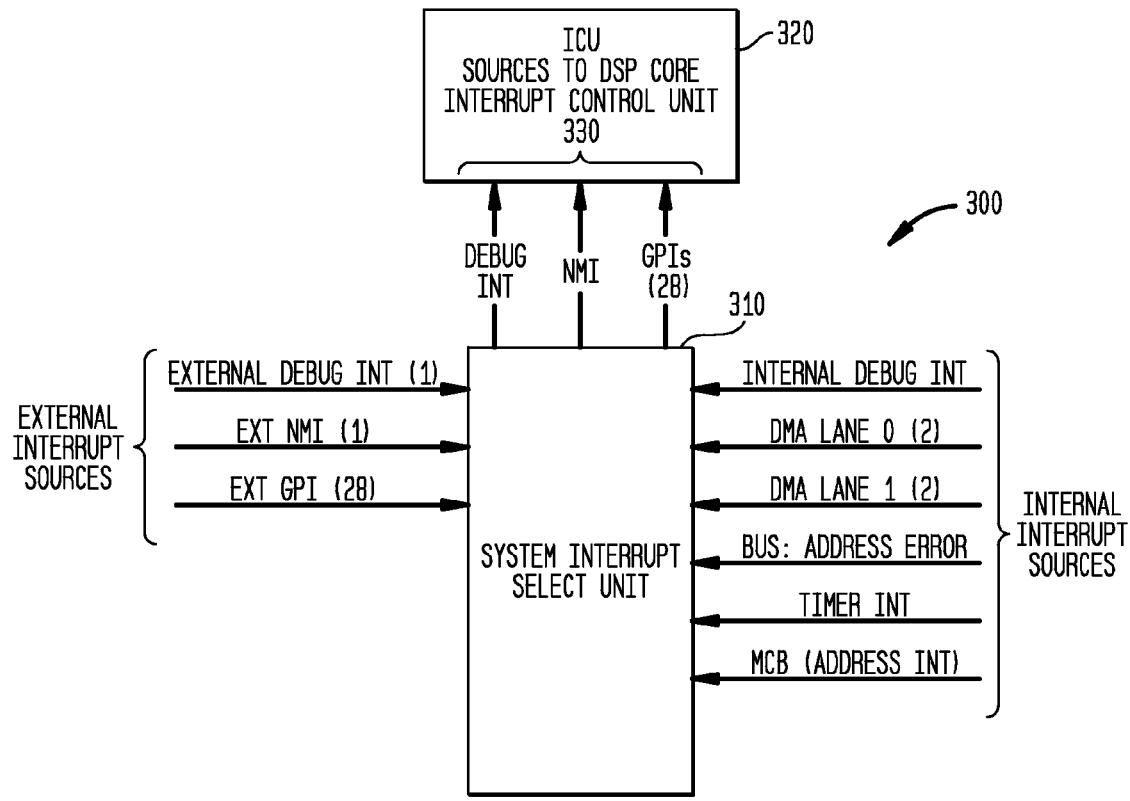

FIG. 7

| VECTOR | VECTOR ADDRESS IN INSTRUCTION MEMORY | NAME | INTERRUPT SOURCES | | | | | |
|---|---|---|---|---|---|---|---|---|
| | | | EXTERNAL | INTERNAL | ADDRESS INTERRUPT (MCB) ENABLED BY ADIEN[0] | ADDRESS INTERRUPT (Mbox1) ENABLED BY ADIEN[1] | ADDRESS INTERRUPT (Mbox2) ENABLED BY ADIEN[2] | ADDRESS INTERRUPT (Mbox3) ENABLED BY ADIEN[3] |
| 0 | 0x0000 | ---- | NONE | RESERVED | RESERVED | RESERVED | RESERVED | RESERVED |
| 1 | 0x0004 | ---- | NONE | RESERVED | RESERVED | RESERVED | RESERVED | RESERVED |
| 2 | 0x0008 | DBG | NONE | DEBUG | 0x00300202 | 0x00300222 | 0x00300242 | 0x00300262 |
| 3 | 0x000c | NMI | ExtNMI | BusError | 0x00300203 | 0x00300223 | 0x00300243 | 0x00300263 |
| 4 | 0x0010 | GPI04 | ExtInt04 | SYS_TIMER | 0x00300204 | 0x00300224 | 0x00300244 | 0x00300264 |
| 5 | 0x0014 | GPI05 | ExtInt05 | RESERVED | 0x00300205 | 0x00300225 | 0x00300245 | 0x00300265 |
| 6 | 0x0018 | GPI06 | ExtInt06 | RESERVED | 0x00300206 | 0x00300226 | 0x00300246 | 0x00300266 |
| 7 | 0x001c | GPI07 | ExtInt07 | RESERVED | 0x00300207 | 0x00300227 | 0x00300247 | 0x00300267 |
| 8 | 0x0020 | GPI08 | ExtInt08 | DMA0_ctu | 0x00300208 | 0x00300228 | 0x00300248 | 0x00300268 |
| 9 | 0x0024 | GPI09 | ExtInt09 | DMA0_stu | 0x00300209 | 0x00300229 | 0x00300249 | 0x00300269 |
| 10 | 0x0028 | GPI10 | ExtInt10 | DMA1_ctu | 0x0030020A | 0x0030022A | 0x0030024A | 0x0030026A |
| 11 | 0x002c | GPI11 | ExtInt11 | DMA1_stu | 0x0030020B | 0x0030022B | 0x0030024B | 0x0030026B |
| 12 | 0x0030 | GPI12 | ExtInt12 | RESERVED | 0x0030020C | 0x0030022C | 0x0030024C | 0x0030026C |
| 13 | 0x0034 | GPI13 | ExtInt13 | RESERVED | 0x0030020D | 0x0030022D | 0x0030024D | 0x0030026D |
| 14 | 0x0038 | GPI14 | ExtInt14 | RESERVED | 0x0030020E | 0x0030022E | 0x0030024E | 0x0030026E |
| 15 | 0x003c | GPI15 | ExtInt15 | RESERVED | 0x0030020F | 0x0030022F | 0x0030024F | 0x0030026F |
| 16 | 0x0040 | GPI16 | ExtInt16 | RESERVED | 0x00300210 | 0x00300230 | 0x00300250 | 0x00300270 |
| 17 | 0x0044 | GPI17 | ExtInt17 | RESERVED | 0x00300211 | 0x00300231 | 0x00300251 | 0x00300271 |
| 18 | 0x0048 | GPI18 | ExtInt18 | RESERVED | 0x00300212 | 0x00300232 | 0x00300252 | 0x00300272 |
| 19 | 0x004c | GPI19 | ExtInt19 | RESERVED | 0x00300213 | 0x00300233 | 0x00300253 | 0x00300273 |
| 20 | 0x0050 | GPI20 | ExtInt20 | RESERVED | 0x00300214 | 0x00300234 | 0x00300254 | 0x00300274 |
| 21 | 0x0054 | GPI21 | ExtInt21 | RESERVED | 0x00300215 | 0x00300235 | 0x00300255 | 0x00300275 |
| 22 | 0x0058 | GPI22 | ExtInt22 | RESERVED | 0x00300216 | 0x00300236 | 0x00300256 | 0x00300276 |
| 23 | 0x005c | GPI23 | ExtInt23 | RESERVED | 0x00300217 | 0x00300237 | 0x00300257 | 0x00300277 |
| 24 | 0x0060 | GPI24 | ExtInt24 | RESERVED | 0x00300218 | 0x00300238 | 0x00300258 | 0x00300278 |
| 25 | 0x0064 | GPI25 | ExtInt25 | RESERVED | 0x00300219 | 0x00300239 | 0x00300259 | 0x00300279 |
| 26 | 0x0068 | GPI26 | ExtInt26 | RESERVED | 0x0030021A | 0x0030023A | 0x0030025A | 0x0030027A |
| 27 | 0x006c | GPI27 | ExtInt27 | RESERVED | 0x0030021B | 0x0030023B | 0x0030025B | 0x0030027B |
| 28 | 0x0070 | GPI28 | ExtInt28 | RESERVED | 0x0030021C | 0x0030023C | 0x0030025C | 0x0030027C |
| 29 | 0x0074 | GPI29 | ExtInt29 | RESERVED | 0x0030021D | 0x0030023D | 0x0030025D | 0x0030027D |
| 30 | 0x0078 | GPI30 | ExtInt30 | RESERVED | 0x0030021E | 0x0030023E | 0x0030025E | 0x0030027E |
| 31 | 0x007c | GPI31 | ExtInt31 | RESERVED | 0x0030021F | 0x0030023F | 0x0030025F | 0x0030027F |

| SYSCALL Vector | VECTOR ADDRESS IN INSTRUCTION MEMORY | NAME |
|---|---|---|
| 0 | 0x0080 | SYSCALL0 |
| 1 | 0x0084 | SYSCALL1 |
| 2 | 0x0088 | SYSCALL2 |
| 3 | 0x008c | SYSCALL3 |
| 4 | 0x0090 | SYSCALL4 |
| 5 | 0x0094 | SYSCALL5 |
| 6 | 0x0098 | SYSCALL6 |
| 7 | 0x009c | SYSCALL7 |
| 8 | 0x00a0 | SYSCALL8 |
| 9 | 0x00a4 | SYSCALL9 |
| 10 | 0x00a8 | SYSCALL10 |
| 11 | 0x00ac | SYSCALL11 |
| 12 | 0x00b0 | SYSCALL12 |
| 13 | 0x00b4 | SYSCALL13 |
| 14 | 0x00b8 | SYSCALL14 |
| 15 | 0x00bc | SYSCALL15 |
| 16 | 0x00c0 | SYSCALL16 |
| 17 | 0x00c4 | SYSCALL17 |
| 18 | 0x00c8 | SYSCALL18 |
| 19 | 0x00cc | SYSCALL19 |
| 20 | 0x00d0 | SYSCALL20 |
| 21 | 0x00d4 | SYSCALL21 |
| 22 | 0x00d8 | SYSCALL22 |
| 23 | 0x00dc | SYSCALL23 |
| 24 | 0x00e0 | SYSCALL24 |
| 25 | 0x00e4 | SYSCALL25 |
| 26 | 0x00e8 | SYSCALL26 |
| 27 | 0x00ec | SYSCALL27 |
| 28 | 0x00f0 | SYSCALL28 |
| 29 | 0x00f4 | SYSCALL29 |
| 30 | 0x00f8 | SYSCALL30 |
| 31 | 0x00fc | SYSCALL31 |

FIG. 9

| MNEMONIC | REG TYPE | NAME | DESCRIPTION |
|---|---|---|---|
| INTSRC | SPR | CORE INTERRUPT SELECT REGISTER | SELECTS BETWEEN AND EXTERNAL AND INTERNAL SOURCE FOR AN INTERRUPT SIGNAL TO THE DSP ICU. |
| ADIEN | SPR | ADDRESS INTERRUPT ENABLE REGISTER | ENABLES ADDRESS RANGES FOR INTERRUPT GENERATION. |
| IER | MRF | INTERRUPT ENABLE REGISTER | INTERRUPT ENABLE/DISABLE AT THE DSP CORE. |
| IRR | MRF | INTERRUPT REQUEST REGISTER | LATCHES PENDING INTERRUPTS TO THE DSP CORE. |
| SCR0 | MRF | STATUS AND CONTROL REGISTER 0 | BITS: GIE, NMIE AND DBIE CONTROL INTERRUPT ENABLES FOR GPI'S, NMI AND DEBUG INTERRUPT CLASSES RESPECTIVELY. THE 'ILVL' FIELD INDICATES THE CURRENT OPERATING MODE AND IS USED TO DETERMINE RETI OPERATION (WHICH REGISTERS ARE SELECTED FOR HARDWARE RESTOR). |
| MRFXAR | MRF | MRF EXTENSION ADDRESS REGISTER | THE VALUE IN THIS REGISTER DETERMINES THE CURRENTLY ADDRESSED MRF EXTENSION REGISTER. A BIT IN THIS REGISTER ALSO ENABLES AUTO-INCREMENT OF THE ADDRESS. |
| MRFXDR | MRF | MRF EXTENSION DATA REGISTER | THIS REGISTER INDIRECTLY ALLOWS ACCESS TO THE MRF EXTENSION REGISTER ADDRESSED BY MRFXAR. |
| ALUIFR0 | MRFX | ALU INTERRUPT FORWARDING REGISTER 0 | STORES FIRST 32 BITS OF ALU 2-CYCLE INSTRUCTION WRITE-DATA DURING INTERRUPT PROCESSING. |
| ALUIFR1 | MRFX | ALU INTERRUPT FORWARDING REGISTER 1 | STORES SECOND 32 BITS OF ALU 2-CYCLE INSTRUCTION WRITE-DATA DURING INTERRUPT PROCESSING. |
| MAUIFR0 | MRFX | MAU INTERRUPT FORWARDING REGISTER 0 | STORES FIRST 32 BITS OF MAU 2-CYCLE INSTRUCTION WRITE-DATA DURING INTERRUPT PROCESSING. |
| MAUIFR1 | MRFX | MAU INTERRUPT FORWARDING REGISTER 1 | STORES SECOND 32 BITS OF MAU 2-CYCLE INSTRUCTION WRITE-DATA DURING INTERRUPT PROCESSING. |
| IFRADR | MRFX | INTERRUPT FORWARDING REGISTER ADDRESS REGISTER | STORES IFR TARGET REGISTER ADDRESSES AND WRITE-ENABLES FOR 2-CYCLE INSTRUCTIONS DURING INTERRUPT PROCESSING. |
| SSR0 | MRFX | SAVED STATUS REGISTER 0 | STORES FIRST 32-BITS OF HOT CONDITIONS FOR INTERRUPT PROCESSING. |
| STATUS SAVED REGISTER1 | MRFX | SAVED STATUS REGISTER 1 | STORES SECOND 32-BITS OF HOT CONDITIONS FOR INTERRUPT PROCESSING. |
| STATUS SAVED REGISTER2 | MRFX | SAVED STATUS REGISTER 2 | STORES THIRD 32-BITS OF HOT CONDITIONS FOR INTERRUPT PROCESSING. |

FIG. 10C

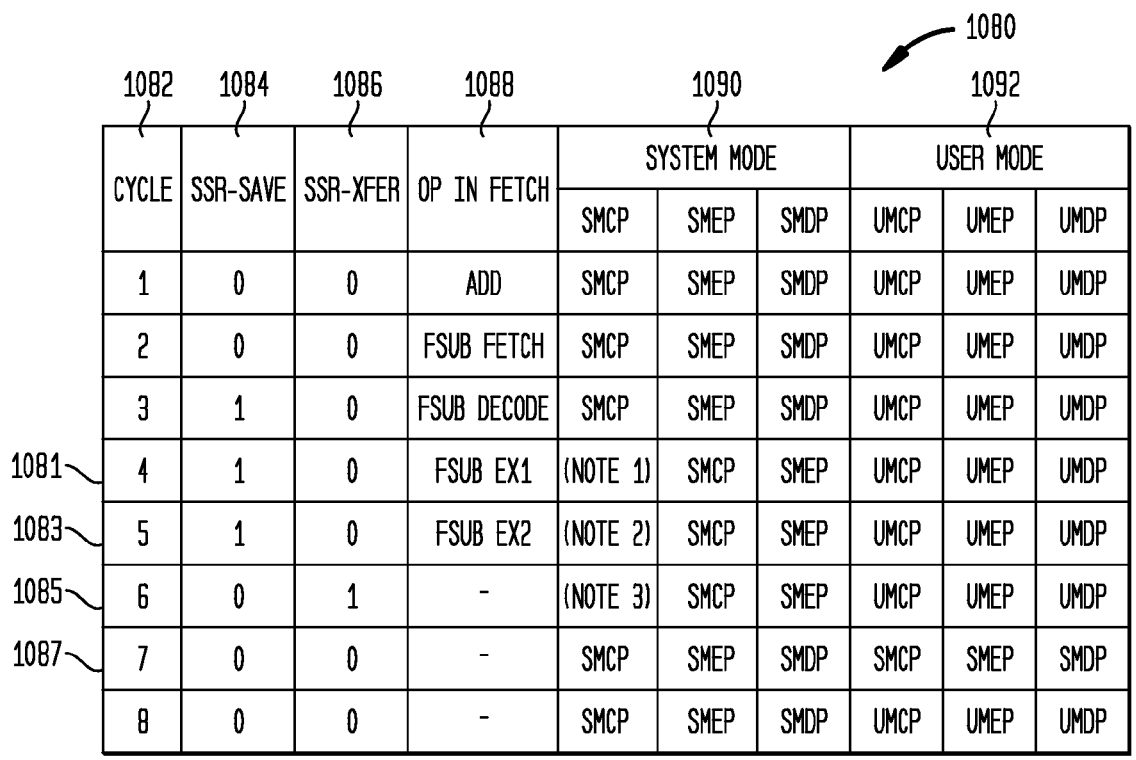

NOTE 1: IN CYCLE 4, SINCE THE SSR-SAVE SIGNAL WAS ASSERTED, THE FSUB HOT FLAGS AND HOT STATE FLAGS WILL BE SAVED INTO SMCP.

NOTE 2: IN CYCLE 5, SMEP IS LOADED WITH THE CONTENTS OF SMCP, AND SMCP IS LOADED WITH THE CURRENT HOT FLAGS AND THE HOT STATE FLAGS FROM CYCLE 4.

NOTE 3: IN CYCLE 6, SMDP GETS THE CONTENTS OF SMEP, SMEP GETS THE CONTENTS OF SMCP, AND SMCP GETS LOADED WITH THE CURRENT HOT FLAGS, AND THE HOT STATE FLAGS FOR CYCLE 4.

| CYCLE | INTERRUPT STATE | SSR-SAVE | SSR-XFER | IRR | INTERRUPT LINK REGISTER | ISR | IE | IMODE | F | PD | D | EX1 | CR |
|-------|-----------------|----------|----------|-----|-------------------------|-----|----|-------|---|----|---|-----|-----|
| 1 | IDLE | 0 | 0 | 0 | - | - | 1 | USR | ADD | | | | |
| 2 | IDLE | 0 | 0 | 1 | - | - | 1 | USR | SUB | ADD | | | |
| 3 | ARB | 1 | 0 | 1 | - | - | 1 | USR | - | NOP | ADD | | |
| 4 | IVEC | 1 | 0 | 1 | - | - | 1 | USR | IVEC | NOP | NOP | ADD | |
| 5 | ISR | 1 | 0 | 1 | - | - | 1 | USR | ISP | NOP | NOP | NOP | |
| 6 | | 0 | 1* | 0/1 | SUB | SCR0 | 0 | GPI | | ISP | NOP | NOP | |
| 7 | | 0 | 0 | 0/1 | SUB | SCR0 | 0 | GPI | | | ISP | NOP | |
| 8 | | 0 | 0 | 0/1 | SUB | SCR0 | 0 | GPI | | | | ISP | |

| ENCODING | EXECUTION | EFFECT ON ACFs | EXAMPLE INSTRUCTION |
|----------|-----------|----------------|---------------------|
| 00 | EXECUTE | DO NOT AFFECT | copy.sd.w R0, R1 |
| 01 | COND. EXEC IF F0 IS TRUE | DO NOT AFFECT | T.copy.sd.w R0, R1 |
| 10 | COND. EXEC IF F0 IS FALSE | DO NOT AFFECT | F.copy.sd.w R0, R1 |
| 11 | EXECUTE | ACFs ← SetCC FLAGS | Addcc... WHERE cc IS ENCODED IN Setcc REGISTER AS SPECIFIED IN TABLE A |

FIG. 11

| ENCODING | EXECUTION | EFFECT ON ACFs? | EXAMPLE INSTRUCTION |
|---|---|---|---|
| 000 | EXECUTE | DO NOT AFFECT | add.sa.1w R0, R1, R2 |
| 001 | COND. EXEC IF F0 IS TRUE | DO NOT AFFECT | T.add.sa.1w R0, R1, R2 |
| 010 | COND. EXEC IF F0 IS FALSE | DO NOT AFFECT | F.add.sa.1w R0, R1, R2 |
| 011 | EXECUTE | ACF←SetCC FLAGS | Addcc... WHERE cc IS ENCODED IN Setcc REGISTER AS SPECIFIED IN FIGS 14A & B |
| 100 | COND. EXEC ON MULTIPLE FLAGS DETERMINED BY THE NUMBER OF DATA ELEMENTS IN THE CURRENT INSTRUCTION, IF Fn IS TRUE OPERATE ON THE CORRESPONDING DATA ELEMENT. | DO NOT AFFECT | Tn.add.sa.4h R0, R2, R4 |
| 101 | COND. EXEC ON MULTIPLE FLAGS DETERMINED BY THE NUMBER OF DATA ELEMENTS IN THE CURRENT INSTRUCTION, IF Fn IS FALSE OPERATE ON THE CORRESPONDING DATA ELEMENT. | DO NOT AFFECT | Fn.add.sa.4h R0, R2, R4 |
| 110 | EXECUTE | ACFs←N | SprecvN.pd.w R0, R1, 2x2PE1 |
| 111 | EXECUTE | ACFs←Z | SprecvZ.pd.w R0, R1, 2x2PE0 |

FIG. 13

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GPIE | NMIE | DBIE | IMODE | | R | SymSat | RESERVED | | | CC | C | N | V | Z | | RESERVED | | ccmask | | | | SetCC | | | | | | | | | |
| | | | | | | | | | | | | | | | | | | | | | | F7 | F6 | F5 | F4 | F3 | F2 | F1 | F0 | | |

| Setcc BITS | cc | DESCRIPTION | C-N-V-Z SETTING OF F0 AND cc EXCEPTION SIGNAL |
|---|---|---|---|
| 00000 | AVS | ANY OVERFLOW SET | cc, F0←Size[V7 OR V6 OR... V0] |
| 00001 | AHS (CS) | ANY HIGHER OR SAME (UNSIGNED, OR CARRY SET) | cc, F0←Size[C7 OR C6 OR... C0] |
| 00010 | ANEG | ANY NEGATIVE | cc, F0←Size[N7 OR N6 OR... N0] |
| 00011 | AS (EQ) | ANY ZERO OR EQUAL | F0←Size[Z7 OR Z6 OR... Z0] |
| 00100 | AHI | ANY HIGHER (UNSIGNED) | cc, F0←Size{[ (C7=1)&&(Z7=0) ] OR [ (C6=1)&&(Z6=0) ] OR... [ (C0=1) && (Z0=0) ]} |
| 00101 | ALS | ANY LOWER OR SAME (UNSIGNED) | cc, F0←Size{[ (C7=0)\|\|(Z7=1) ] OR [ (C6=0)\|\|(Z6=1) ] OR... [ (C0=0)\|\|(Z0=0) ]} |
| 00110 | APOS | ANY POSITIVE | cc, F0←Size{[ (N7=0)&&(Z7=0) ] OR [ (N6=0)&&(Z6=0) ] OR... [ (N0=0)&&(Z0=0) ]} |
| 00111 | AGT | ANY GREATER-THAN (SIGNED) | cc, F0←Size{[ (Z7=0)&&(N7=V7) ] OR [ (Z6=0)&&(N6=V6) ] OR... [ (Z0=0)&&(N0=V0) ]} |
| 01000 | ALE | ANY LESS-THAN OR EQUAL (SIGNED) | cc, F0←Size{[ (Z7=1)\|\|(N7!=V7) ] OR [ (Z6=1)\|\|(N6!=V6) ] OR... [ (Z0=1)\|\|(N0!=V0) ]} |
| 01001 | ALT | ANY LESS-THAN (SIGNED) | cc, F0←Size{[ (N7!=V7) OR [N6!=V6] OR... [N0!=V0]} |
| 01010 | | RESERVED | |
| 01011 | | RESERVED | |
| 01100 | | RESERVED | |
| 01101 | | RESERVED | |
| 01110 | | RESERVED | |
| 01111 | | RESERVED | |

| Setcc BITS | CC | DESCRIPTION | C-N-V-Z SETTING OF ACFs |
|---|---|---|---|
| 10000 | VS | OVERFLOW SET PER OPERATION | Size{F7←V7, F6←V6, ..., F0←V0} |
| 10001 | HS (CS) | HIGHER OR SAME (UNSIGNED, OR CARRY SET) PER OPERATION | Size{F7←C7, F6←C6, ..., F0←C0} |
| 10010 | NEG | NEGATIVE PER OPERATION | Size{F7←N7, F6←N6, ..., F0←N0} |
| 10011 | Z (EQ) | ZERO OR EQUAL PER OPERATION | Size{F7←Z7, F6←Z6, ..., F0←Z0} |
| 10100 | HI | HIGHER (UNSIGNED) PER OPERATION | Size{F7←[(C7=1)&&(Z7=0)], F6←[(C6=1)&&(Z6=0)], ..., F0←[(C0=1)&&(Z0=0)]} |
| 10101 | LS | LOWER OR SAME (UNSIGNED) PER OPERATION | Size{F7←[(C7=0)\|\|(Z7=1)], F6←[(C6=0)\|\|(Z6=1)], ..., F0←[(C0=0)\|\|(Z0=1)]} |
| 10110 | POS | POSITIVE PER OPERATION | Size{F7←[(N7=0)&&(Z7=0)], F6←[(N6=0)&&(Z6=0)], ..., F0←[(N0=0)&&(Z0=0)]} |
| 10111 | GT | GREATER-THAN (SIGNED) PER OPERATION | Size{F7←[(Z7=0)&&(N7=V7)], F6←[(Z6=0)&&(N6=V6)], ..., F0←[(Z0=0)&&(N0=V0)]} |
| 11000 | LE | LESS-THAN OR EQUAL (SIGNED) PER OPERATION | Size{F7←[(Z7=1)\|\|(N7!=V7)], F6←[(Z6=1)\|\|(N6!=V6)], ..., F0←[(Z0=1)\|\|(N0!=V0)]} |
| 11001 | LT | LESS-THAN (SIGNED) PER OPERATION | Size{F7←[(N7!=V7], F6←[(N6!=V6], ..., F0←[(N0!=V0]} |
| 11010 | | RESERVED | |
| 11011 | | RESERVED | |
| 11100 | | RESERVED | |
| 11101 | | RESERVED | |
| 11110 | | RESERVED | |
| 11111 | | RESERVED | |

FIG. 18

DBIR REGISTER

MCB ADDRESS: 0x00700084    SPR ADDRESS: 0X0084    RESET VALUE: UNDEFINED
INSTRUCTION ADDRESS: 0X0000004

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|----|----|----|----|----|----|----|----|----|----|----|----|----|----|----|----|----|----|----|----|----|----|----|----|----|----|----|----|----|----|----|----|
| DEBUG INSTRUCTION REGISTER |||||||||||||||||||||||||||||||||

DBSTAT REGISTER

MCB ADDRESS: 0X0070080    SPR ADDRESS: 0X0080    RESET VALUE: 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|----|----|----|----|----|----|----|----|----|----|----|----|----|----|----|----|----|----|----|----|----|----|----|----|----|----|----|----|----|----|----|----|
| RESERVED |||||||||||||||||||||||||||||| DBSTALL | DBIP | DBDOBF | DBDIBF |

DSPCTL REGISTER

MCB ADDRESS: 0x00700040    SPR ADDRESS: 0X0040    RESET VALUE: 0x000000B3

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|----|----|----|----|----|----|----|----|----|----|----|----|----|----|----|----|----|----|----|----|----|----|----|----|----|----|----|----|----|----|----|----|
| RESERVED |||||||||||||||||||||||||| Rsvd | DBIREn | Rsvd | LockPC | Rsvd | ResetDSP |

DBDOUT REGISTER

MCB ADDRESS: 0x0070008C    SPR ADDRESS: 0X008C    RESET VALUE: UNDEFINED

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|----|----|----|----|----|----|----|----|----|----|----|----|----|----|----|----|----|----|----|----|----|----|----|----|----|----|----|----|----|----|----|----|
| DEBUG DATA OUT ||||||||||||||||||||||||||||||||

2100 →

DBDIN REGISTER

MCB ADDRESS: 0x00700088     SPR ADDRESS: 0X0088     RESET VALUE: UNDEFINED

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| DEBUG DATA IN |||||||||||||||||||||||||||||||||

2200

METHODS AND APPARATUS FOR SCALABLE ARRAY PROCESSOR INTERRUPT DETECTION AND RESPONSE

The present application is a continuation of U.S. application Ser. No. 13/916,877 filed Jun. 13, 2013 which is a continuation of U.S. application Ser. No. 13/417,490 filed Mar. 12, 2012 issued as U.S. Pat. No. 8,489,858 which is a divisional of U.S. application Ser. No. 12/956,316 filed Nov. 30, 2010 issued as U.S. Pat. No. 8,161,267 which is a divisional of U.S. application Ser. No. 12/120,543 filed May 14, 2008 issued as U.S. Pat. No. 7,853,779 which is a divisional of U.S. application Ser. No. 10/931,751 filed Sep. 1, 2004 issued as U.S. Pat. No. 7,386,710 which is a divisional of U.S. application Ser. No. 09/791,256 filed Feb. 23, 2001 issued as U.S. Pat. No. 6,842,811 and claims the benefit of U.S. Provisional Application Ser. No. 60/184,529 filed Feb. 24, 2000 all of which are incorporated by reference herein in their entirety.

FIELD OF THE INVENTION

The present invention relates generally to improved techniques for interrupt detection and response in a scalable pipelined array processor. More particularly, the present invention addresses methods and apparatus for such interrupt detection and response in the context of highly parallel scalable pipeline array processor architectures employing multiple processing elements, such as the manifold array (ManArray) architecture.

BACKGROUND OF THE INVENTION

The typical architecture of a digital signal processor is based upon a sequential model of instruction execution that keeps track of program instruction execution with a program counter. When an interrupt is acknowledged in this model, the normal program flow is interrupted and a branch to an interrupt handler typically occurs. After the interrupt is handled, a return from the interrupt handler occurs and the normal program flow is restarted. This sequential model must be maintained in pipelined processors even when interrupts occur that modify the normal sequential instruction flow. The sequential model of instruction execution is used in the advanced indirect very long instruction word (iVLIW) scalable ManArray processor even though multiple processor elements (PEs) operate in parallel each executing up to five packed data instructions. The ManArray family of core processors provides multiple cores 1×1, 1×2, 2×2, 2×4, 4×4, and so on that provide different performance characteristics depending upon the number of and type of PEs used in the cores.

Each PE typically contains its own register file and local PE memory, resulting in a distributed memory and distributed register file model. Each PE, if not masked off, executes instructions in synchronism and in a sequential flow as dictated by the instruction sequence fetched by a sequence processor (SP) array controller. The SP controls the fetching of the instructions that are sent to all the PEs. This sequential instruction flow must be maintained across all the PEs even when interrupts are detected in the SP that modify the instruction sequence. The sequence of operations and machine state must be the same whether an interrupt occurs or not. In addition, individual PEs can cause errors which can be detected and reported by a distributed interrupt mechanism. In a pipelined array processor, determining which instruction, which PE, and which data element in a packed data operation may have caused an exception type of interrupt is a difficult task.

In developing complex systems and debugging of complex programs, it is important to provide mechanisms that control instruction fetching, provide single-step operation, monitor for internal core and external core events, provide the ability to modify registers, instruction memory, VLIW memory (VIM), and data memory, and provide instruction address and data address eventpoints. There are two standard approaches to achieving the desired observability and controllability of hardware for debug purposes.

One approach involves the use of scan chains and clock-stepping, along with a suitable hardware interface, possibly via a joint test action group (JTAG) interface, to a debug control module that supports basic debug commands. This approach allows access on a cycle by cycle basis to any resources included in the scan chains, usually registers and memory. It relies on the library/process technology to support the scan chain insertion and may change with each implementation.

The second approach uses a resident debug monitor program, which may be linked with an application or reside in on-chip read only memory ROM. Debug interrupts may be triggered by internal or external events, and the monitor program then interacts with an external debugger to provide access to internal resources using the instruction set of the processor.

It is important to note that the use of scan chains is a hardware intensive approach which relies on supporting hardware external to the core processor to be available for testing and debug. In a system-on-chip (SOC) environment where processing cores from one company are mixed with other hardware functions, such as peripheral interfaces possibly from other companies, requiring specialized external hardware support for debug and development reasons is a difficult approach. In the second approach described above, requiring the supporting debug monitor program be resident with an application or in an on-chip ROM is also not desirable due to the reduction in the application program space.

Thus, it is recognized that it will be highly advantageous to have a multiple-PE synchronized interrupt control and a dynamic debug monitor mechanism provided in a scalable processor family of embedded cores based on a single architecture model that uses common tools to support software configurable processor designs optimized for performance, power, and price across multiple types of applications using standard application specific integral circuit (ASIC) processes as discussed further below.

SUMMARY OF THE INVENTION

In one aspect of the present invention, a manifold array (ManArray) architecture is adapted to employ the present invention to solve the problem of maintaining the sequential program execution model with interrupts in a highly parallel scalable pipelined array processor containing multiple processing elements and distributed memories and register files. In this aspect, PE exception interrupts are supported and low latency interrupt processing is provided for embedded systems where real time signal processing is required. In addition, the interrupt apparatus proposed here provides debug monitor functions that allow for a debug operation without a debug monitor program being loaded along with or prior to loading application code. This approach provides a dynamic debug monitor, in which the debug monitor code is dynamically loaded into the processor and executed on any debug event that stops the processor, such as a breakpoint or "stop" command. The debug monitor code is unloaded when processing resumes. This approach may also advantageously include a static debug monitor as a subset of its operation and it also provides some of the benefits of fully external debug control which is found in the scan chain approach.

Various further aspects of the present invention include effective techniques for synchronized interrupt control in the multiple PE environment, interruptible pipelined 2-cycle instructions, and condition forwarding techniques allowing interrupts between instructions. Further, techniques for address interrupts which provide a range of addresses on a master control bus (MCB) to which mailbox data may be written, with each address able to cause a different maskable interrupt, are provided. Further, special fetch control is provided for addresses in an interrupt vector table (IVT) which allows fetch to occur from within the memory at the specified address, or from a general coprocessor instruction port, such as the debug instruction register (DBIR) at interrupt vector 1 of the Manta implementation of the ManArray architecture, by way of example.

These and other advantages of the present invention will be apparent from the drawings and the Detailed Description which follow.

BRIEF DESCRIPTION OF THE DRAWINGS

FIG. 2A illustrates an exemplary encoding and syntax/operation table for a system call interrupt (SYSCALL) instruction in accordance with the present invention;

FIG. 2B illustrates a four mode interrupt transition state diagram;

FIG. 3 illustrates external and internal interrupt requests to and output from a system interrupt select unit in accordance with the present invention;

FIG. 7 illustrates an exemplary interrupt vector table (IVT) which may suitably reside in instruction memory;

FIG. 8 illustrates a SYSCALL instruction vector mapping in accordance with the present invention;

FIG. 9 illustrates the registers involved in interrupt processing;

FIG. 10C illustrates pipeline flow when an interrupt occurs and the saving of flag information in saved status registers (SSRs);

FIG. 10D illustrates pipeline flow for single cycle short instruction words when a user mode program is preempted by a GPI;

FIG. 11 illustrates a CE3c encoding description for 3-bit conditional execution;

FIG. 12 illustrates a CE2b encoding description for 2-bit conditional execution;

FIG. 13 illustrates a status and control register 0 (SCR0) bit placement;

FIG. 14A illustrates a SetCC register 5-bit encoding description for conditional execution and PE exception interrupts;

FIG. 14B illustrates a SetCC register 5-bit encoding description for conditional execution and PE exception interrupts;

FIG. 18 illustrates aspects of the utilization of a debug instruction register (DBIR);

FIG. 19 illustrates aspects of the utilization of DSP control register (DSPCTL);

FIG. 20 illustrates aspects of the utilization of a debug status register (DBSTAT);

FIGS. 21 and 22 illustrate aspects of the utilization of a debug-data-out (DBDOUT) and debug-data-in (DBDIN) register, respectively; and FIG. 23 illustrates aspects of an exemplary DSP ManArray residing on an MCB and ManArray data bus (MDB).

DETAILED DESCRIPTION

Further details of a presently preferred ManArray core, architecture, and instructions for use in conjunction with the present invention are found in:

U.S. Pat. No. 6,023,753;
U.S. Pat. No. 6,167,502;
U.S. Pat. No. 6,343,356;
U.S. Pat. No. 6,167,501;
U.S. Pat. No. 6,219,776;
U.S. Pat. No. 6,151,668;
U.S. Pat. No. 6,173,389;
U.S. Pat. No. 6,216,223;
U.S. Pat. No. 6,366,999;
U.S. Pat. No. 6,446,190;
U.S. Pat. No. 6,356,994;
U.S. Pat. No. 6,408,382;
U.S. Pat. No. 6,697,427;
U.S. Pat. No. 6,260,082;
U.S. Pat. No. 6,256,683;
U.S. Pat. No. 6,397,324;
U.S. patent application Ser. No. 09/598,567 entitled "Methods and Apparatus for Improved Efficiency in Pipeline Simulation and Emulation" filed Jun. 21, 2000;
U.S. Pat. No. 6,622,234;
U.S. Pat. No. 6,735,690;
U.S. Pat. No. 6,654,870;
U.S. patent application Ser. No. 09/599,980 entitled "Methods and Apparatus for Parallel Processing Utilizing a Manifold Array (ManArray) Architecture and Instruction Syntax" filed Jun. 22, 2000;
U.S. patent application Ser. No. 09/791,940 entitled "Methods and Apparatus for Providing Bit-Reversal and Multicast Functions Utilizing DMA Controller" filed Feb. 23, 2001; and
U.S. patent application Ser. No. 09/792,819 entitled "Methods and Apparatus for Flexible Strength Coprocessing Interface" filed Feb. 23, 2001;

all of which are assigned to the assignee of the present invention and incorporated by reference herein in their entirety.

Figure 1:
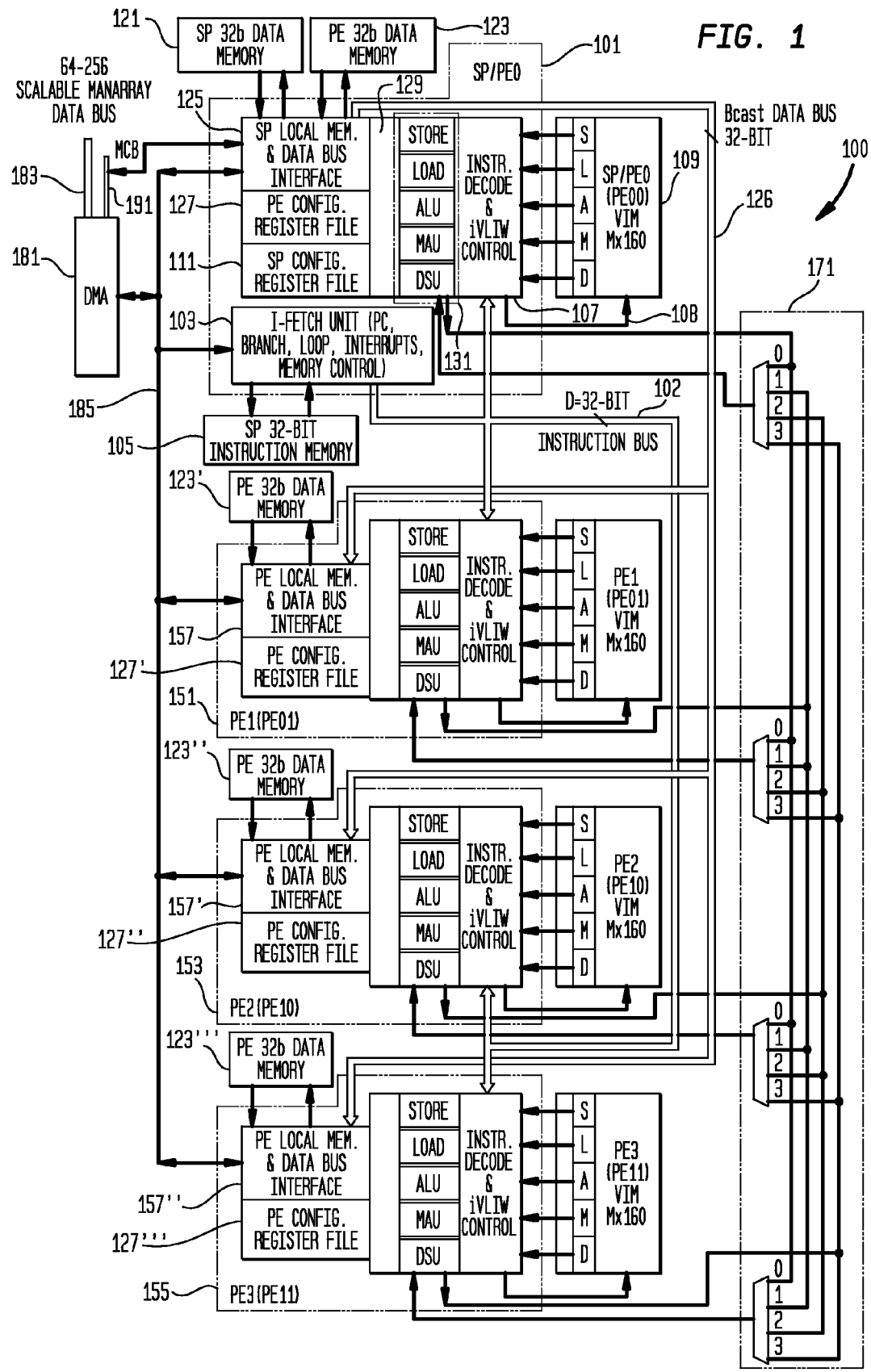
FIG. 1 illustrates a ManArray 2×2 iVLIW processor which can suitably be employed with this invention.

In a presently preferred embodiment of the present invention, a ManArray 2×2 iVLIW single instruction multiple data stream (SIMD) processor 100 as shown in FIG. 1 may be adapted as described further below for use in conjunction with the present invention. Processor 100 comprises a sequence processor (SP) controller combined with a processing element-0 (PE0) to is form an SP/PE0 combined unit 101, as described in further detail in U.S. patent application Ser. No. 09/169,072 entitled "Methods and Apparatus for Dynamically Merging an Array Controller with an Array Processing Element". Three additional PEs 151, 153, and 155 are also utilized to demonstrate the apparatus for scalable array processor interrupt detection and response mechanism. It is noted that the PEs can be also labeled with their matrix positions as shown in parentheses for PE0 (PE00) 101, PE1 (PE01)151, PE2 (PE10) 153, and PE3 (PE11) 155. The SP/PE0 101 contains an instruction fetch (I-fetch) controller 103 to allow the fetching of short instruction words (SIW) or abbreviated-instruction words from a B-bit instruction memory 105, where B is determined by the application instruction-abbreviation process to be a reduced number of bits representing ManArray native instructions and/or to contain two or more abbreviated instructions as further described in U.S. patent application Ser. No. 09/422,015 filed Oct. 21, 1999 and incorporated by reference herein in its entirety. If an instruction abbreviation apparatus is not used then B is determined by the SIW format. The fetch controller 103 provides the typical functions needed in a programmable processor, such as a program counter (PC), a branch capability, event-point loop operations (see U.S. Provisional Application Ser. No. 60/140,245 entitled "Methods and Apparatus for Generalized Event Detection and Action Specification in a Processor" filed Jun. 21, 1999 for further details), and support for interrupts. It also provides the instruction memory control which could include an instruction cache if needed by an application. In addition, the I-fetch controller 103 dispatches instruction words and instruction control information to the other PEs in the system by means of a D-bit instruction bus 102. D is determined by the implementation, which for the exemplary ManArray coprocessor D=32-bits. The instruction bus 102 may include additional control signals as needed in an abbreviated-instruction translation apparatus.

In this exemplary system 100, common elements are used throughout to simplify the explanation, though actual implementations are not limited to this restriction. For example, the execution units 131 in the combined SP/PE0 101 can be separated into a set of execution units optimized for the control function, for example, fixed point execution units in the SP, and the PE0 as well as the other PEs can be optimized for a floating point application. For the purposes of this description, it is assumed that the execution units 131 are of the same type in the SP/PE0 and the PEs. In a similar manner, SP/PE0 and the other PEs use a five instruction slot iVLIW architecture which contains a VLIW memory (VIM) 109 and an instruction decode and VIM controller functional unit 107 which receives instructions as dispatched from the SP/PE0's I-fetch unit 103 and generates VIM addresses and control signals 108 required to access the iVLIWs stored in the VIM. Referenced instruction types are identified by the letters SLAMD in VIM 109, where the letters are matched up with instruction types as follows: Store (S), Load (L), Arithmetic Logic Unit or ALU (A), Multiply Accumulate Unit or MAU (M), and Data Select Unit or DSU (D).

The basic concept of loading the iVLIWs is described in more detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register file 127 which is described in further detail in U.S. patent application Ser. No. 09/169,255 entitled "Method and Apparatus for Dynamic Instruction Controlled Reconfiguration Register File with Extended Precision". Due to the combined nature of the SP/PE0 the data memory interface controller 125 must handle the data processing needs of both the SP controller, with SP data in memory 121, and PE0, with PE0 data in memory 123. The SP/PE0 controller 125 also is the controlling point of the data that is sent over the 32-bit or 64-bit broadcast data bus 126. The other PEs, 151, 153, and 155 contain common physical data memory units 123', 123'', and 123''' though the data stored in them is generally different as required by the local processing done on each PE. The interface to these PE data memories is also a common design in PEs 1, 2, and 3 and indicated by PE local memory and data bus interface logic 157, 157' and 157''. Interconnecting the PEs for data transfer communications is the cluster switch 171 various aspects of which are described in greater detail in U.S. patent application Ser. No. 08/885,310 entitled "Manifold Array Processor", and U.S. patent application Ser. No. 09/169,256 entitled "Methods and Apparatus for Manifold Array Processing", and U.S. patent application Ser. No. 09/169,256 entitled "Methods and Apparatus for ManArray PE-to-PE Switch Control". The interface to a host processor, other peripheral devices, and/or external memory can be done in many ways. For completeness, a primary interface mechanism is contained in a direct memory access (DMA) control unit 181 that provides a scalable ManArray data bus (MDB) 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray control bus (MCB) 191 is also shown in FIG. 1. The ManArray architecture uses two primary bus interfaces: the ManArray data bus (MDB), and the ManArray control bus (MCB). The MDB provides for high volume data flow in and out of the DSP array. The MCB provides a path for peripheral access and control. The width of either bus varies between different implementations of ManArray processor cores. The width of the MDB is set according to the data bandwidth requirements of the array in a given application, as well as the overall complexity of the on-chip system. Further details of presently preferred DMA control and coprocessing interface techniques are found in U.S. application Ser. No. 09/791,940 and Provisional Application Ser. No. 60/184,668 both of which are entitled "Methods and Apparatus for Providing Bit-Reversal and Multicast Functions Utilizing DMA Controller" and which were filed Feb. 23, 2001 and Feb. 24, 2000, respectively, and U.S. application Ser. No. 09/972,819 and Provisional Application Ser. No. 60/184,560 both entitled "Methods and Apparatus for Flexible Strength Coprocessing Interface" filed Feb. 23, 2001 and Feb. 24, 2000, respectively, all of which are incorporated by reference in their entirety herein.

Interrupt Processing

Up to 32 interrupts including general purpose interrupts (GPI-4-GPI-31), non-maskable interrupts (NMI), and others, are recognized, prioritized, and processed in this exemplary ManArray scalable array processor in accordance with the present invention as described further below. To begin with, a processor interrupt is an event which causes the preemption of the currently executing program in order to initiate special program actions. Processing an interrupt generally involves the following steps:

Save the minimum context of the currently executing program,

Save the current instruction address (or program counter),

Determine the interrupt service routine (ISR) start address and branch to it,

Execute the interrupt program code until a "return from interrupt" instruction is decoded, Restore the interrupted program's context, and Restore the program counter and resume the interrupted program.

Interrupts are specified in three primary ways: a classification of the interrupt signals into three levels, whether they are asynchronous versus synchronous, and maskable versus non-maskable. Interrupt level is a classification of interrupt signals where the classification is by rank or degree of importance. In an exemplary ManArray system, there are three levels of interrupts where 1 is the lowest and 3 the highest. These ManArray interrupts levels are: interrupt level 1 is for GPI and SYSCALL; interrupt level 2 is for NMI; and interrupt level 3 is for Debug. SYSCALL is an instruction which causes the address of an instruction immediately following SYSCALL to be saved in a general-purpose interrupt link register (GPILR) and the PC is loaded with the specified vector from the system vector table. The system vector table contains 32 vectors numbered from 0 to 31. Each vector contains a 32-bit address used as the target of a SYSCALL. FIG. 2A shows an exemplary encoding 202 and a syntax/operation table 204 for a presently preferred SYSCALL instruction.

By design choice, interrupts at one classification level cannot preempt interrupts at the same level or interrupts at a higher level, unless this rule is specifically overridden by software, but may preempt interrupts at a lower level. This condition creates a hierarchical interrupt structure. Synchronous interrupts occur as a result of instruction execution while asynchronous interrupts occur as a result of events external to the instruction processing pipeline. Maskable interrupts are those which may be enabled or disabled by software while non-maskable interrupts may not be disabled, once they have been enabled, by software. Interrupt enable/disable bits control whether an interrupt is serviced or not. An interrupt can become pending even if it is disabled.

Interrupt hardware provides for the following:

Interrupt sources and source selection,

Interrupt control (enable/disable),

Interrupt mapping: source event-to-ISR, and

Hardware support for context save/restore.

These items are discussed further below.

Interrupt Modes and Priorities

In ManArray processors, there are four interrupt modes of operation not including low power modes, and three levels of interrupts which cause the processor to switch between modes. The modes shown in the four mode interrupt transition state diagram 200 of FIG. 2B are: a user mode 205, a system mode 210, an NMI mode 215, and a debug mode 220. User mode is the normal mode of operation for an application program, system mode is the mode of operation associated with handling a first level type of interrupt, such as a GPI or SYSCALL, NMI mode is the mode of operation associated with the handling of a non-maskable interrupt, for example the processing state associated with a loss of power interrupt, and debug mode is the mode of operation associated with the handling of a debut interrupt, such as single step and break points.

A processor mode of operation is characterized by the type of interrupts that can, by default, preempt it and the hardware support for context saving and restoration. In an exemplary ManArray core, there are up to 28 GPI level interrupts that may be pending, GPI-04 through GPI-31, with GPI-04 having highest priority and GPI-31 lowest when more than one GPI is asserted simultaneously. State diagram 200 of FIG. 2B illustrates the processor modes and how interrupts of each level cause mode transitions. The interrupt hardware automatically masks interrupts (disables interrupt service) at the same or lower level once an interrupt is accepted for processing (acknowledged). The software may reenable a pending interrupt, but this should be done only after copying to memory the registers which were saved by hardware when the interrupt being processed was acknowledged, otherwise they will be overwritten. The default rules are:

GPI 233, SYSCALL 234, NMI 232 and debug interrupts 231 may preempt a user mode 205 program. SYSCALL 234 does this explicitly.

NMI 237 and debug interrupts 236 may preempt a GPI program (ISR) running in system mode 210.

Debug interrupts 238 may preempt an NMI mode 215 program (ISR).

GPIs save status (PC and flags) and 2-cycle instruction data registers when acknowledged. SYSCALL 234 operates the same as a GPI 233 from the standpoint of saving state, and uses the same registers as the GPIs 233.

Debug interrupts 231 save status and 2-cycle instruction data registers when they preempt user mode 205 programs, but save only status information when they preempt system mode ISRs 210 or NMI ISRs 215. The state saved during interrupt processing is discussed further below.

NMI interrupts 237 save status but share the same hardware with system mode 210. Therefore, non-maskable interrupts are not fully recoverable to the pre-interrupt state, but the context in which they occur is saved.

3—Interrupt Sources

There are multiple sources of interrupts to a DSP core, such as the ManArray processor described herein. These sources may be divided into two basic types, synchronous and asynchronous. Synchronous interrupts are generated as a direct result of instruction execution within the DSP core. Asynchronous interrupts are generated as a result of other system events. Asynchronous interrupt sources may be further divided into external sources (those coming from outside the ManArray system core) and internal sources (those coming from devices within the system core). Up to 32 interrupt signals may be simultaneously asserted to the DSP core at any time, and each of these 32 may arise from multiple sources. A module called the system interrupt select unit (SISU) gathers all interrupt sources and, based on its configuration which is programmable in software, selects which of the possible 32 interrupts may be sent to the DSP core. There is a central interrupt controller 320 shown in FIG. 3 called the interrupt control unit (ICU) within the DSP core. One task of the ICU is to arbitrate between the 32 pending interrupts which are held in an interrupt request register (IRR) within the ICU. The ICU arbitrates between pending interrupts in the IRR on each cycle.

Synchronous Interrupt Sources

One method of initiating an interrupt is by directly setting bits in the interrupt request register (IRR) that is located in the DSP interrupt control unit (ICU) 320. This direct setting may be done by load instructions or DSU COPY or BIT operations.

Another method of initiating an interrupt is by using a SYSCALL instruction. This SYSCALL initiated interrupt is a synchronous interrupt which operates at the same level as GPIs. SYSCALL is a control instruction which combines the features of a call instruction with those of an interrupt. The argument to the SYSCALL instruction is a vector number. This number refers to an entry in the SYSCALL table 800 of FIG. 8 which is located in SP instruction memory starting at address 0x00000080 through address 0x000000FF containing 32 vectors. A SYSCALL is at the same level as a GPI and causes GPIs to be disabled via the general purpose interrupt enable (GIE) bit in status and control register 0 (SCR0). It also uses the same interrupt status and link registers as a GPI.

Asynchronous Interrupt Sources

Asynchronous interrupt sources are grouped under their respective interrupt levels, Debug, NMI and GPI. The address interrupt described further below can generate any of these three levels of interrupts.

Debug and Address Interrupts

Debug interrupt resources include the debug control register, debug instruction register and debug breakpoint registers. Examples of debug interrupts in the context of the exemplary ManArray processor are for software break points and for single stepping the processor.

Address interrupts are a mechanism for invoking any interrupt by writing to a particular address on the MCB as listed in table 700 of FIG. 7. When a write is detected to an address mapped to an address interrupt, the corresponding interrupt signal is asserted to the DSP core interrupt control unit. There are four ranges of 32 byte addresses each of which are defined to generate address interrupts. A write to an address in a first range (Range 0) 720 causes the corresponding interrupt, a single pulse on the wire to the ICU. A write to a second range (Range 1) 725 causes assertion of the corresponding interrupt signal and also writes the data to a register "mailbox" (MBOX1). A write to further ranges (Ranges 2 and 3) 730 and 735, respectively, has the same effect as a write to Range 1, with data going to register mailboxes 2 and 3, respectively. In another example, an address interrupt may be used to generate an NMI to the DSP core by writing to one of the addresses associated with an NMI row 740 and one of the columns 710. For further details, see the interrupt source/vector table of FIG. 7 and its discussion below.

NMI

The NMI may come from either an internal or external source. It may be invoked by either a signal or by an address interrupt.

GPI Level Interrupts

The general purpose interrupts may suitably include, four example, DMA, timer, bus errors, external interrupts, and address interrupts. There are four DMA interrupt signals (wires), two from each DMA lane controller (LC). LCs are also capable of generating address interrupts via the MCB.

A system timer is designed to provide a periodic interrupt source and an absolute time reference.

When a bus master generates a target address which is not acknowledged by a slave device, an interrupt may be generated.

External interrupts are signals which are inputs to the processor system core interface.

An address interrupt may be used to generate any GPI to the DSP core, in a similar manner to that described above in connection debug and address interrupts.

Interrupt Selection

External and internal interrupt signals converge at a system interrupt select unit (SISU) 310 shown in interrupt interface 300 of FIG. 3. Registers in this unit allow selection and control of internal and external interrupt sources for sending to the DSP ICU. A single register, the interrupt source control register (INTSRC) determines if a particular interrupt vector will respond to an internal or external interrupt. FIG. 3 shows the interrupt sources converging at the SISU 310 and the resulting set of 30 interrupt signals 330 sent to the interrupt request register (IRR) in the DSP ICU 320.

Figure 4:
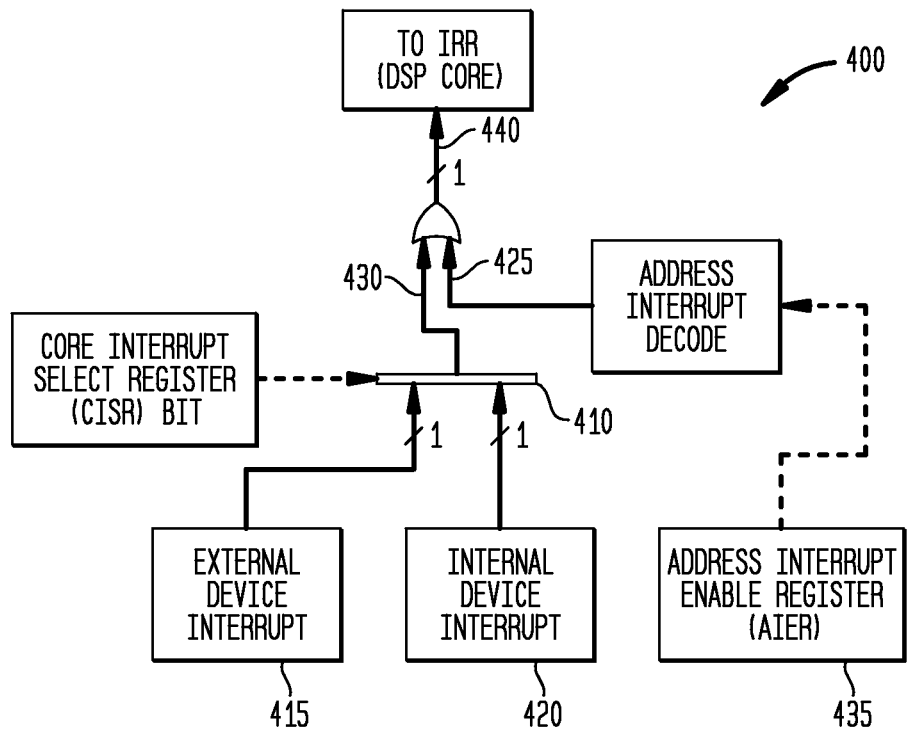
FIG. 4 illustrates how a single general purpose interrupt (GPI) bit of an interrupt request register (IRR) is generated in accordance with the present invention.
Figure 5:
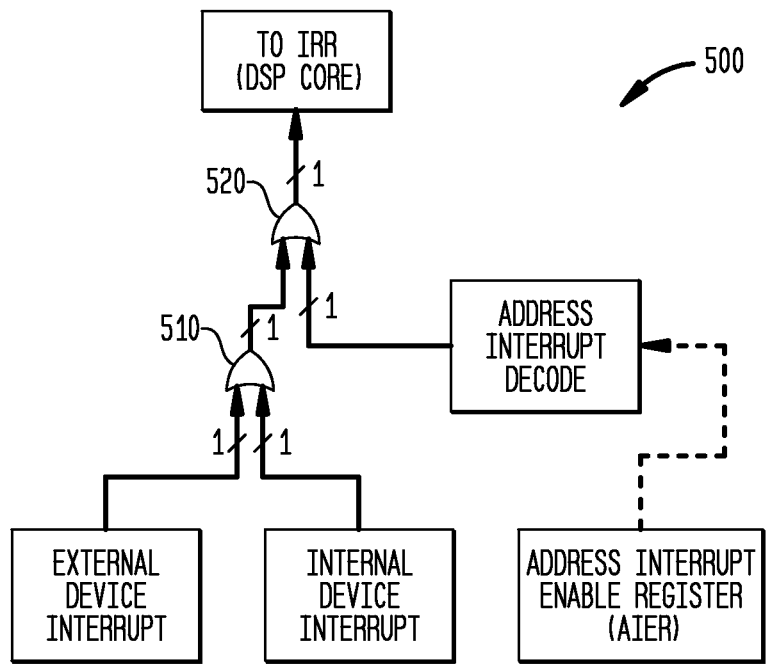
FIG. 5 illustrates how a non maskable interrupt bit in the IRR is generated from an OR of its sources.
Figure 6:
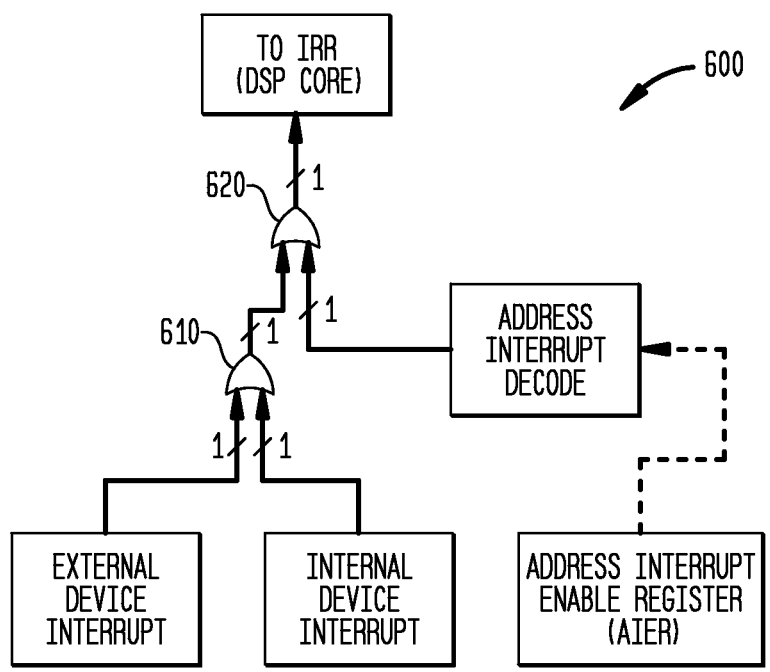
FIG. 6 illustrates how a debug interrupt bit in the IRR is generated from an OR of its sources.

FIG. 4 shows logic circuitry 400 to illustrate how a single GPI bit of the interrupt request register (IRR) is generated. A core interrupt select register (CISRS) bit 412 selects via multiplexer 410 between an external 415 or internal 420 interrupt source. An address interrupt 425 enabled by an address interrupt enable register (AIER) 435 or a selected interrupt source 430 generates the interrupt request 440. FIG. 5 shows logic circuitry 500 which illustrates how the NMI bit in the IRR is generated from its sources. Note that the sources are Ored (510, 520) together rather than multiplexed allowing any NMI event to pass through unmasked. FIG. 6 shows logic circuitry 600 illustrating how the DBG bit in the IRR is generated from its sources. Note again that the sources are ORed (610, 620) together rather than multiplexed.

Mapping Interrupts to Interrupt Service Routines (ISRs)

There are two mechanisms for mapping interrupt events to their associated ISRs. Asynchronous interrupts are mapped to interrupt handlers through an interrupt vector table (IVT) 700 shown in FIG. 7 which also describes the assignment of interrupt sources to their corresponding vectors in the interrupt vector table.

Software generated SYSCALL interrupts are mapped to interrupt handlers through a SYSCALL vector table 800 shown in FIG. 8. The interrupt vector table 700 may advantageously reside in a processor instruction memory from address 0x00000000 through address 0x0000 007F. It consists of 32 addresses, each of which contains the address of the first instruction of an ISR corresponding to an interrupt source.

An example of operation in accordance with the present invention is discussed below. Interrupt GPI-04 715 of FIG. 7 has an associated interrupt vector (address pointer) 04 at address 0x00000010 in instruction memory which should be initialized to contain the address of the first instruction of an ISR for GIP-04. This vector may be invoked by an external interrupt source, if the external source is enabled in the INTSRC register. In the exemplary ManArray processor, when GPI-04 is configured for an internal source, the interrupt may be asserted by the DSP system timer. In addition, MCB data writes to addresses 0x00300204, 0x00300224, 0x00300244, and 0x00300264 will cause this interrupt to be asserted if their respective ranges are enabled in the address interrupt enable register (ADIEN). Writes to the last three addresses will additionally latch data in the corresponding "mailbox" register MBOX1, MBOX2, or MBOX3 which can be used for interprocessor communication.

FIG. 8 shows SYSCALL vector mapping 800. ISRs which are invoked with SYSCALL have the same characteristics as GPI ISRs.

Interrupt Control

Registers involved with interrupt control are shown in register table 900 of FIG. 9.

Further details of the presently preferred interrupt source control register and the address interrupt enable register are shown in the tables below

| INTSRC Interrupt Source Configuration Register Table Reset value: 0x00000000 | | | | | | | | | |
|---|---|---|---|---|---|---|---|---|---|
| 31 | 30 | 29 | 28 | 27 | 26 | 25 | 24 | 23 | 22 |
| EXT31 | EXT30 | EXT29 | EXT28 | EXT27 | EXT26 | EXT25 | EXT24 | EXT23 | EXT22 |
| 21 | 20 | 19 | 18 | 17 | 16 | 15 | 14 | 13 | 12 |
| EXT21 | EXT20 | EXT19 | EXT18 | EXT17 | EXT16 | EXT15 | EXT14 | EXT13 | EXT12 |

-continued

| 11 | 10 | 09 | 08 | 07 | 06 | 05 | 04 | 03 | 02 | 01 | 00 |
|----|----|----|----|----|----|----|----|----|----|----|----|
| EXT11 | EXT10 | EXT09 | EXT08 | EXT07 | EXT06 | EXT05 | EXT04 | R | R | R | R |

R     Reserved
EXTxx    0 = Internal
          1 = External

ADIEN Address Interrupt Enable Register
Reset value: 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|----|----|----|----|----|----|----|----|----|----|----|----|----|----|----|----|----|----|----|----|----|----|----|----|----|----|----|----|----|----|----|----|
| | | | | | | | | | | | | | | | | | | | | | | | | | | | | AIR3 | AIR2 | AIR1 | AIR0 |

AIRX    Enable Address Interrupt Range 'x'
         0 = Address Interrupt for range 'x' disabled
         1 = Address Interrupt for range 'x' enabled Address interrupts are triggered by writes to specific addresses (mapped to the ManArray Control Bus). Each range contains 32 (byte) addresses. When a range's AIR bit is set, a write to a particular address in the range causes the corresponding interrupt to be asserted to the DSP core.

Interrupt Processing Specifics

Interrupt processing involves the following steps:
1. Interrupt detection,
2. Interrupt arbitration,
3. Save essential program state (PC, flags, 2-cycle target data),
4. Fetch IVT vector into PC,
5. Execute ISR,
6. Execute RETI,
7. Restore essential program state, and
8. Restore PC from appropriate interrupt link register.

Some specific points of the exemplary ManArray processor implementation are:

When multiple interrupts are pending their service order is as follows: Debug, NMI, and GPI-04, GPI-05, . . . etc.

A SYSCALL instruction, if in decode, will execute as if it were of higher priority than any GPI. If there is an NMI or Debug interrupt pending, then the SYSCALL ISR will be preempted after the first instruction is admitted to the pipe (only one instruction of the ISR will execute).

One instruction is allowed to execute at any level before the next interrupt is allowed to preempt. This constraint means that if an RETI is executed at the end of a GPI ISR and another GPI is pending, then exactly one instruction of the USER level program will execute before the next GPI's ISR is fetched.

The Debug interrupt saves PC, flags and interrupt forwarding registers (IFRs) when it is accepted for processing (acknowledged) while in User mode. If it is acknowledged while in GPI mode or NMI mode, it will only save PC and flags as it uses the same IFRs as the GPI level.

If processing a Debug interrupt ISR, and the Debug IRR bit is set, then an RETI will result in exactly one instruction executing before returning to the Debug ISR.

Load VLIW (LV) instructions are not interruptible and therefore are considered one (multi-cycle) instruction. Further details of LV instructions are provided in U.S. Pat. No. 6,151,668 which is incorporated by reference herein in its entirety.

Interrupt Pipeline Diagrams

Figure 10A:
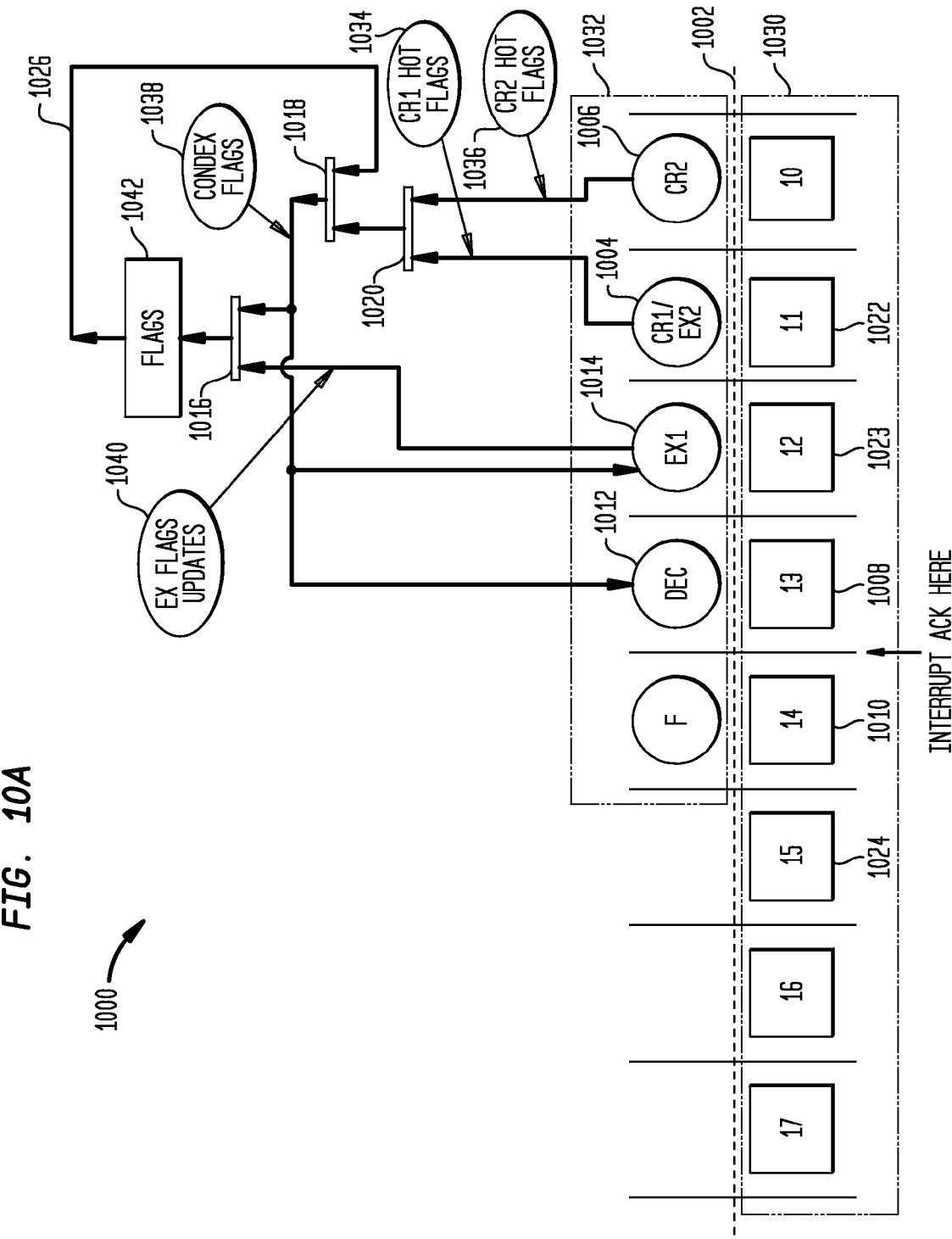
FIG. 10A illustrates a sliding interrupt processing pipeline diagram.
Figure 10B:
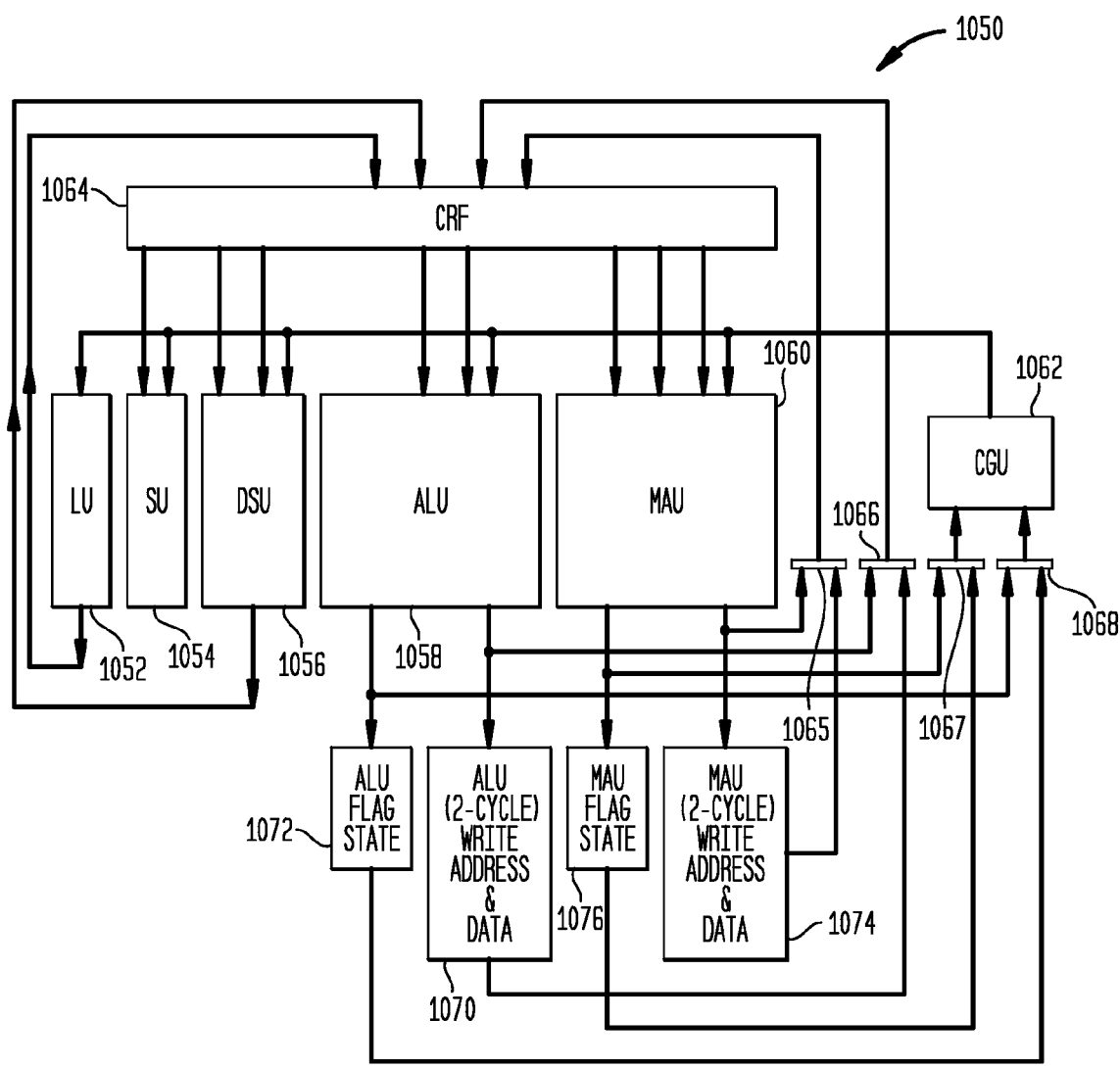
FIG. 10B illustrates interrupt forwarding registers used in the SP and all PEs.

FIG. 10A depicts an interrupt pipeline diagram 1000 that can be used to depict the events that happen in an instruction flow when an interrupt occurs. To use the diagram for this purpose, follow these directions:
1. Cut FIG. 10A along dashed line 1002, and
2. Slide "instruction stream" I0-I7 1030 under execution units fetch (F), decode (DEC), execute 1 (Ex1), condition return 1/execute 2 (CR1/EX2) and condition return 2 (CR2) to 1032 observe flag generation and condition feedback visually. FIG. 10B illustrates a system 1050 with interrupt forwarding registers used in an SP and all PEs with functional units, load unit (LU) 1052, store unit (SU) 1054, DSU 1056, ALU 1058, MAU 1060 and condition generation unit (CGU) 1062. Configurable register file, also known as compute register file (CRF) 1064 is also shown. FIG. 10C shows a flag table 1080 illustrating saved flag information within the saved status registers (SSRs).

FIG. 10A is based upon the following assumptions:
1. Only current flags 1026 and hot conditions 1034 from condition return 1 (CR1) 1004 and hot conditions 1036 from CR2 1006 affect conditional execution. Hot conditions are the condition information generated in the last stage of an execution unit's operation and are available in the condition return stage of the pipeline prior to their being latched at the end of the condition return stage. The net result of condition generation unit (CGU) 1062 condition reduction is labeled "Condex flags" (1038).

2. Execution unit updates (EX Flag Updates) 1040 do not affect conditional execution until the instruction which generates them reaches CR1 phase.

Interrupt acknowledge occurs between I3 1008 and I4 1010. On RETI, the state of the pipe must be restored so that it appears to I4 as if no interrupt had occurred.

4. Each execution unit supplies hot condition flags and pipe phase information. The CGU 1062 must decode this information into a set of flags from each phase or "no flags" if a phase does not have an instruction which updates flags. Using this information, it can supply the correct "Condex flags" 1038 to the DEC and EX1 in stages 1012 and 1014, and update the latched flags 1042 correctly.

5. Note that the muxes 1016, 1018 and 1020 represent the logical "selection" between flag information from each phase.

Referring to FIG. 10A and sliding the instructions I0-I7 1030 right along the execution units 1032, interrupt processing proceeds as follows:

When instruction 3 (I3) 1008 is in DEC 1012: The interrupt is acknowledged. The fetch program counter (PC) which contains the address of I4 1010 is saved to the correct interrupt link register (ILR).

2. When I3 is in execute 1(EX1) pipeline stage 1014: Update all flags according to I1 1022, I2 1023 and I3 1008 normally. Save the Condex flags. These are the "hot" flags which are to be supplied to I4 1010 when it is in decode.

3. When I3 1008 is in CR1 1004: Save the status and control register (SCR0) since this might be read by I4 in EX1 and it might have been updated by I3 in EX1. Update Condex flags based on I2 and I3, and save the Condex flags. These will be fed back to I4 1010 and I5 1024 and provided as input to flag update mux 1016 (selecting between Condex flags and EX Flag Updates). If I3 contains a 2-cycle instruction, execution unit result data must be saved to an interrupt forwarding register (IFR). Both ALU 1058 and MAU 1060 require 64-bit IFRs to save this data.

4. When I3 is in CR2: Since I3 might be a 2-cycle instruction, save CR2 flags (shown in figure). These flags will be fed into the CR1/CR2 flag select mux 1020 when I4 reaches CR1. All other select inputs will by then be supplied by new instructions I4 and I5.

On the return from interrupt (RETI), the following events occur:

1. Restore ILR to fetch PC and fetch I4.
2. I4 in DEC: Supply Condex flags that were saved in step 2 above. These flags will be used for conditional execution. Restore saved SCR0 (from Step 3) since this SCR0 is read by I4.
3. I4 in EX1: Supply Condex flags that were saved in Step 3 above for I4 and I5 conditional execution. Condex flags are also supplied to EX/Condex Flag select mux 1016. Since I4 provides flag information to the CGU, the CGU determines the proper update based on the saved Condex flag information and new I4 EX flag update information. If 2-cycle data from I3 was saved, supply this to the write-back path of CRF 1064 via multiplexers 1065 and 1066. This will update the CRF 1064 unless I4 contains 1-cycle instructions in the same unit(s) that I3 used for 2-cycle instructions.
4. I4 in CR1: Supply CR2 flags to CR1/CR2 mux 1020, with all other mux controls provided normally by CGU based on inputs from instructions (I4 and I5) in earlier stages.
5. Done, instruction processing continues normally.

The hardware provides interrupt forwarding registers 1070-1076 as illustrated in the system 1050 of FIG. 10B, in the SP and all PEs that are used as follows:

(1) When an interrupt occurs and is acknowledged, all instructions in the decode phase are allowed to proceed through execute. One-cycle instructions are allowed to complete and update their target registers and flags. Any two-cycle instructions are allowed to complete also, but their output, which includes result data, result operand register addresses and flag information, is saved in a set of special purpose registers termed the "interrupt forwarding registers" (IFRs) 1070-1076 as shown in FIG. 10B, and no update is made to the register file (CRF) 1064 or status registers.

Uniquely, when an interrupt occurs, interface signals are provided to all PEs to support the following operations independently in each PE dependent upon the local PE instruction sequence prior to the interrupt. For example, there can be a different mixture of 1-cycle and 2-cycle instructions in each PE at the time of an interrupt and by using this signal interface and local information in each PE the proper operation will occur in each PE on the return from interrupt, providing synchronized interrupt control in the multiple PE environment. These interface signals include save/restore signals, interrupt type, and extended or normal pipe status. Specifically, these interface signals are:

Save SSR State Machine State (SP_VCU_s_ssr_state[1:0])

These two bits indicate the state of an internal Save Saved Status Register (SSR) state machine. The signals represent 4 possible states (IDLE, I4_EX, I5_EX, I6_EX). When not in the idle state, the Save SSR state machine indicates the phase of the pipe that the interrupted instruction would be in had an interrupt not occurred. If you consider a sequence of 6 instructions (I1, I2, . . . , I6), and the fourth instruction is interrupted, the listed state machine labels indicate when the $4^{th}$, $5^{th}$ and $6^{th}$ instructions would have been in the execute phase of the pipeline. This machine state information is used locally in each PE as one of the indicators for when the IFRs need to be saved and what state needs to be saved to SSRs.

Restore SSR state machine state (SP_VCU_r_ssr_state[1:10])

These bits indicate the state of an internal Restore SSR state machine. The signals represent 4 possible states (IDLE, I4_DC, I5_DC, I6_DC). When not in the idle state, the Restore SSR state machine indicates the phase of the pipe that the interrupted instruction is in after it is fetched and put into the pipe again (i.e., from a return from interrupt). If you consider a sequence of 6 instructions (I1, I2, . . . ,I6), and the fourth instruction is interrupted, the state machine labels indicate when the $4^{th}$, $5^{th}$ and $6^{th}$ instructions are in the decode phase of the pipeline. This machine state information is used locally in each PE as one of the indicators for when the IFRs need to be restored and when state needs to be restored from the SSRs.

Save SSRs (SP_VCU_save_ssr)

This bit indicates when the SSRs must be saved.

Transfer System SSRs to User SSRs (SP_VCU_xfer_ssr)

This signal indicates the System SSRs must be transferred to the User SSRs.

Select User SSRs (VCU_sel_gssr)

This signal indicates which SSRs (System or User SSRs) should be used when restoring the SSR to the hot flags and SCR0. It is asserted when restoring flags from the System SSRs.

Extend Pipe when Returning from Interrupt Service Routine (SP_VCU_reti_extend_pipe)

When asserted, this bit indicates that a return from interrupt will need to extend the pipe.

(2) The address of the instruction in FETCH phase (current PC) is saved to the appropriate link register.

(3) The interrupt handler is invoked through the normal means such as a vector table lookup and branch to target address.

(4) When the RETI instruction is executed, it causes the restoration of the saved SCR0 and link address from the appropriate link and saved-status registers.

(5) When the instruction at the link address reaches the EXECUTE phase, the data in the interrupt forwarding registers, for those units whose last instruction prior to interrupt handling was a two-cycle instruction, is made available to the register file 1064 and the CGU 1062 instead of the data coming from the corresponding unit. From the CGU and register file point of view, this operation has the same behavior that would have occurred if the interrupt had never happened.

FIGS. 10C and 10 D illustrate interrupt pipeline diagrams 1080 and 1090 for an example of interrupt processing as currently implemented. The columns SSR Save 1084, SSR-XFER 1086, OP in Fetch 1088, System Mode 1090 and User Mode 1092 in FIG. 10C show the state of the interrupt state machine for each cycle indicated in the cycle column 1082. Further, FIG. 10D shows the pipeline state of a bit within the interrupt request register (IRR) 1095, the instruction whose address is contained in the interrupt link register (ILR) 1096, the state of the interrupt status register (ISR) 1097, the state of the GPIE interrupt enable bit found in SCR0 1098, the interrupt level (ILVL) 1099, and the instruction being processed in the set of pipeline stages (fetch (F) 1021, predecode (PD)

1023, decode (D) 1025, execute 1 (EX1) 1027, and condition return (CR) 1029). It is assumed that the individually selectable general purpose interrupts are enabled and the interrupt vector number that is stored in SCR1 gets updated at the same time that IMOD is updated in SCR0.

In the present exemplary processes, any time an interrupt is taken, there will be 3 cycles during which information needed to restore the pipeline is saved away in the saved status registers (SSR0, SSR1, and SSR2). The information is saved when the SSR-SAVE column 1084 in table 1080 has a "1" in it. The easiest way to understand how the three 32-bit SSR registers are loaded is by breaking them down into six 16-bit fields. SSR0 is made up of the user mode decode phase (UMDP) and user mode execute phase (UMEP) components. SSR1 is made up of the user mode condition return phase (UMCP) and system mode condition return phase (SMCP) components. SSR2 is made up of the system mode decode phase (SMDP) and system mode execute phase (SMEP) components.

SMCP—System Mode Condition Return Phase (Upper Half of SSR1)

SMEP—System Mode Execution Phase (Upper Half of SSR2)

SMDP—System Mode Decode Phase (Lower Half of SSR2)

UMCP—User Mode Condition Return Phase (Lower Half of SSR1)

UMEP—User Mode Execute Phase (Upper Half of SSR0)

UMDP—User Mode Decode Phase (Lower Half of SSR0)

When interrupt processing begins, the data is first stored to the system mode registers. Then, depending on the mode of operation before and after the interrupt, the system mode registers, may be transferred to the user mode registers. For example, if the mode of operation before the interrupt is taken is a USER mode, the SSR-XFER will be asserted. If the SSR-XFER bit in column 1086 is asserted, the contents of the system mode registers are transferred to the user mode registers.

In the example shown in FIG. 10C, the floating point subtract (Fsub), a 2-cycle instruction, is preempted by an interrupt. The Hot State Flags (HOTSFs) are control bits indicating local machine state in the exemplary implementation and these are as follows:

HOTSFs={HOTSF3, HOTSF2, HOTSF1, HOTSF0};

HOTSF3=bit indicating that a 2-cycle operation is in execute and it could have control of the flag update.

HOTSF2=bit indicating that a 2-cycle ALU instruction is in the execute (EX1) pipeline stage.

HOTSF1=bit indicating that a 2-cycle MAU instruction is in the execute (EX1) pipeline stage.

HOTSF0=bit indicating that a LU or DSU instruction that is targeted at SCR0 is in the execute (EX1) pipeline stage.

In cycle 4, 1081, since the SSR-SAVE signal was asserted, the FSub hotflags and hot state flags will be saved into SMCP. The SMCP is loaded with the Hotflags, arithmetic scalar flags (CNVZ) arithmetic condition flags (F0-F7), and the HOTSFs signals for the instruction that would be in Execute if the interrupt had not occurred, in this example, the FSub. In cycle 5 1083, SMEP is loaded with the contents of SMCP, and SMCP is loaded with the current hotflags and the hot state flags from cycle 4. The SMCP is loaded with the Hotflags (CNVZ & F0-F7) and the HOTSFs from the previous cycle. In cycle 6 1085, SMDP gets the contents of SMEP, SMEP gets the contents of SMCP, and SMCP gets loaded with the current hotflags, and the hot state flags for cycle 4. The SMCP is loaded with the Hotflags (CNVZ & F0-F7) and the HOTSFs from two cycles before In cycle 7 1087, since the SSR-XFER signal was asserted in the previous cycle, the user mode phase components are loaded with copies of the system mode phase components.

Whenever the SSR-save bit is asserted and a 2-cycle operation (ALU or MAU) is in the EX2 pipeline stage, the target compute register of the 2-cycle operation is not updated. Rather, the data, address, and write enables, i.e., bits indicating data type are stored in the corresponding execution unit forwarding registers.

In more detail, the pipeline diagram of FIG. 10D depicts the events that occur when a GPI preempts a user mode program after the fetch of a single cycle subtract (Sub) short instruction word with a nonexpanded normal pipe. Note that the SSR-XFER bit 1094 is asserted in this case since it is a GPI taking the mode of operation from a user mode (ILVl=USR) to a system mode (ILVL=GPI). It would also be asserted when taking an interrupt that leaves the mode of operation in the same mode as it was before the interrupt came along (i.e., nesting general purpose interrupts). For the interrupt request register (IRR) 1095, the bit corresponding to the interrupt taken is cleared in the IRR. The general purpose or debug interrupt link register (ILR) 1096, holds the address of the instruction that will be executed following the interrupt. In FIG. 10D, only one of these registers (GPILR) is shown in column 1096. The general purpose or debug interrupt status register (GPISR or DBISR) 1097 contains a copy of SCR0, so that flag state may be restored following the interrupt. Here, only one of these registers (GPISR) is shown in column 1097. Interrupt enable (IE), bits 31-29 of SCR0 are GPI enable, NMI enable, and DBI enable—here only the applicable enable bit (GPIE) 1098 is shown. Bits 28 and 27 of SCR0 contain the interrupt mode (IMode) which encodes the four, user, GPI, NMI, or debug modes.

CE3c Extension

In the exemplary ManArray processor, a hierarchical conditional execution architecture is defined comprising 1-bit, 2-bit, and 3-bit forms. The 1-bit form is a subset of the 2-bit and 3-bit forms and the 2-bit form is a subset of the 3-bit form. In the exemplary ManArray processor, the load and store units use a CE1 1-bit form, the MAU, ALU, and DSU use the 3-bit CE3 form, though different implementations may use subsets of the 3-bit form depending upon algorithmic needs. The hierarchical conditional execution architecture is further explained in U.S. patent application Ser. No. 09/238,446 entitled "Methods and Apparatus to Support Conditional Execution in a VLIW-Based Array Processor With Subword Execution" filed on Jan. 28, 1999 and incorporated herein in its entirety.

Two 3-bit forms of conditional execution, CE3a and CE3b, specify how to set the ACFs using C, N, V, or Z flags. These forms are described in greater detail in the above mentioned application. A new 3-bit form is specified in the present invention and labeled CE3c. The N and Z options available in the 3-bit CE3a definition are incorporated in the new CE3c encoding format 1100 encodings 1105 and 1106 respectively, illustrated in FIG. 11. The present invention addresses the adaptation of CE2 to use its presently reserved encoding for a registered SetCC form of conditional execution. The new form of CE2, which is a superset of the previous CE2, is referred to as CE2b whose encoding format is shown in table 1200 of FIG. 12. A new programmable register is used in conjunction with the CE2b and CE3c encodings and is named the SetCC field of SCR0 as addressed further below. These bits are used to specify many new combinations of the arithmetic side effect (C, N, V, and Z) flags to cover exceptions detected in the execution units and to provide enhanced flexibility in each of the instructions for algorithmic use. Due to the improved flexibility, it may be possible to replace the original 3-bit CE3a or CE3b with CE3c in future architectures. Alternatively, a mode bit or bits of control could be provided and the hardware could then support the multiple forms of CE3. These CE3 encodings specify whether an instruction is to unconditionally execute and not affect the ACFs, conditionally execute on true or false and not affect the ACFs, or provide a register specified conditional execution function. The ASFs are set as defined by the instruction. In an exemplary implementation for a ManArray processor, the SetCC field of 5-bits 1310 which will preferably be located in an SCR0 register 1300 as shown in FIG. 13. The new format of SCR0 includes the addition of the SetCC bits 12-8 1310, an exception mask bit-13 1315, and the markable PE exception interrupt signal bit 20 1320. C, N, V, Z, cc, SetCC, ccmask, and F7-F0 bits are always set to 0 by reset. The proposed SetCC definition shown in encoding table 1400 of FIGS. 14A and 14B, specifies some logical combination of flags such as packed data ORing of flags. The encoding also reserves room for floating point exception flags, or the like, for future architectures.

A proposed syntax defining the SetCC operations is "OptypeCC" where the CC represents the options given in FIGS. 14A and 14B for a number of logical combinations of the ASFs. The number of ACFs affected is determined by the packed data element count in the current instruction and shown in FIGS. 14A and 14B. FIGS. 14A and 14B specify the use of packed data side effect signals C, N, V, and Z for each elemental operation of a multiple element packed data operation. These packed data side-effect signals are not programmer visible in the exemplary ManArray system. Specifically, the C7-C0, N7-N0, V7-V0, and Z7-Z0 terms represent internal flag signals pertinent for each data element operation in a packed data operation. "Size" is a packed data function that selects the appropriate affected C7-C0, N7-N0, V7-V0, and Z7-Z0 terms to be ORed based on the number of data elements involved in the packed data operation. For example, in a quad operation, the internal signals C3-C0, N3-N0, V3-V0, and Z3-Z0 may be affected by the operation and would be involved in the ORing while C7-C4, N7-N4, V7-V4, and Z7-Z4 are not affected and would not be involved in the specified operation.

A new form of CE3 conditional execution architecture is next addressed with reference to FIG. 11. Two of the CE3c encodings 1103 and 1104 specify the partial execution of packed data operations based upon the ACFs. CE3c also includes the CE2b general extension that controls the setting of the ACFs based upon the registered SetCC parameter 1102. The proposed CE3c 3-bit conditional execution architecture in ManArray provides the programmer with five different levels of functionality:

1. unconditional execution of the operation, does not affect the ACFs,
2. conditional execution of the operation on all packed data elements, does not affect the ACFs,
3. unconditional execution of the operation, ACFs set as specified by the SetCC register,
4. conditional selection of data elements for execution, does not affect the ACFs, and
5. unconditional execution of the operation with control over ACF setting.

In each case, data elements will be affected by the operation in different ways:

1. In the first case, the operation always occurs on all data elements.
2. In the second case, the operation either occurs on all data elements or the operation does not occur at all.
3. In the third case, the operation always occurs on all data elements and the ACFs are set in the CR phase of this operation. The 011 CE3c encoding 1102 shown in FIG. 11 would allow the ACFs F7-F0 to be set as specified by a SetCC register as seen in FIGS. 14A and 14B.
4. In the fourth case, the operation always occurs but only acts on those data elements that have a corresponding ACF of the appropriate value for the specified true or false coding. In this fourth case, the packed data instruction is considered to partially execute in that the update of the destination register in the SP or in parallel in the PEs only occurs where the corresponding ACF is of the designated condition.
5. In the fifth case, the N and Z flags represent two side effects from the instruction that is executing. An instruction may be unconditionally executed and affect the flags based on one of the conditions, N or Z.

The syntax defining the fourth case operations is "Tm" and "Fm," for "true multiple" and "false multiple." The "multiple" case uses the packed data element count in the current instruction to determine the number of flags to be considered in the operation. For example, an instruction Tm.add.sa.4h would execute the add instruction on each of the 4 halfwords based on the current settings of F0, F1, F2, and F3. This execution occurs regardless of how these four flags were set. This approach enables the testing of one data type with the operation on a second data type. For example, one could operate on quad bytes setting flags F3-F0, then a conditional quad half-word operation can be specified based on F3-F0 providing partial execution of the packed data type based on the states of F3-F0. Certain instructions, primarily those in the MAU and ALU, allow a conditional execution CE3c 3-bit extension field to be specified.

PE Exception Interrupts

Since the interrupt logic is in an SP, such as the SP 101, a mechanism to detect exceptions and forward the PE exception information to the SP is presented next. In addition, a method of determining which instruction caused the exception interrupt, in which PE, and in which sub data type operation is also discussed.

One of the first questions to consider is when can an exception be detected and how will this detection be handled in the pipeline. The present invention operates utilizing a PE exception which can cause an interrupt to the SP and the PE exception is based upon conditions latched at the end of the CR phase. A whole cycle is allowed to propagate any exception signal from the PEs to the interrupt logic in the SP. Each PE is provided with an individual wire for the exception signal to be sent back to the SP where it is stored in an MRF register. These PE exception signals are also ORed together to generate a maskable PE exception interrupt. The cc flag represents the maskable PE exception interrupt signal. By reading the PE exception field in an MRF register, the SP can determine which PE or PEs have exceptions. Additional details relating to the PE exception are obtained by having the SP poll the PE causing an exception to find out the other information concerning the exception such as which data element in a packed operation caused the problem. This PE-local information is stored in a PE MRF register. One acceptable approach to resetting stored exception information is to reset it automatically whenever the values are read.

In certain implementations, it is possible to make selectable the use of the SetCC register to either set the ACFs, cause an exception interrupt, or both for the programmed SetCC register specified condition. If the SetCC is enabled for exception interrupts and if the specified condition is detected, then an exception interrupt would be generated from the PE or PEs detecting the condition. This exception interrupt signal is maskable. If SetCC is to be used for setting ACFs and generating exception interrupts, then, depending upon system requirements, two separate SetCC type registers can be defined in a more optimum manner for each intended use. When a single SetCC register is used for both ACF and exception interrupt, note that the exception cc is tested for every cycle while the F0 flag can only be set when an instruction is issued using 011 CE3c encoding 1102 as shown in FIG. 11.

For determining which instruction caused an exception interrupt, a history buffer in the SP is used containing a set number of instructions in the pipeline history so that the instruction that indirectly caused the PE exception can be determined. The number of history registers used depends upon the length of the instruction pipeline. A method of tagging the instructions in the history buffer to identify which one caused the exception interrupt is used. Even in SMIMD operation, this approach is sufficient since the contents of the VIM can be accessed if necessary. An ACF history buffer in each PE and the SP can also be used to determine which packed data element caused the exception.

Alternatives for the Arithmetic Scalar Flag (ASF) Definition

The definition of the C, N, V, Z flags, known collectively as the ASFs to be used in an exemplary system specifies the ASFs to be based on the least significant operation of a packed data operation. For single or one word (1W) operations, the least significant operation is the same as the single word operation. Consequently, the JMPcc instruction based on C, N, V, Z flags set by the 1W operation is used regularly. Setting of the C, N, V, Z flags by any other type of packed data operation in preparation for a JMPcc conditional branch is not always very useful so improving the definition of the ASFs would be beneficial.

Improvements to the ASF definition addressed by the present invention are described below. The present C flag is replaced with a new version C' that is an OR of the packed data C flags. Likewise the N flag is replaced with a new version N' that is an OR of the packed data N flags, a V' that is an OR of the packed data V flags, and a Z' that is an OR of the packed data Z flags. The OR function is based upon the packed data size, i.e. 4H word OR four flags and an 8B word OR eight. In the 1W case, any existing code for an existing system which uses the JMPcc based upon 1W operations would also work in the new system and no change to the existing code would be needed. With the OR of the separate flags across the data types, some unique capabilities are obtained. For example, if any packed data result produced an overflow, a conditional JMP test could be easily done to branch to an error handling routine.

In a first option, for JMPcc conditions based upon logical combinations of C', N', V', and Z', the preceding operation would need to be of the 1W single word type, otherwise the tested condition may not be very meaningful. To make JMPcc type operations based upon logical combinations of the ASF' flags more useful, a further change is required. The execution units which produce C, N, V, and Z flags must latch the individual packed data C, N, V, and Z flag information at the end of an instruction's execution cycle. In the condition return phase, these individually latched packed data C, N, V, and Z information flags are logically combined to generate individual packed data GT, LE, and the like signals. These individual packed data GT, LE, and the like, signals can then be ORed into hot flag signals for use by the JMPcc type instructions. These OR conditions are shown in FIGS. 14A and 14B and are the same logical combinations used in the SetCC register specified conditions. Then, a JMPGT would branch, if "any" of the packed data operations resulted in a GT comparison. For example, following a packed data SUB instruction with a JMPGT becomes feasible. Rather than saving all packed data flags in a miscellaneous register file (MRF) register only the single hot flag state "cc" being tested for is saved in SCR0. Once the "cc" state has been latched in SCR0 it can be used to cause an exception interrupt as defined further in the PE exception interrupt section below, if this interrupt is not masked.

As an alternate second option, it is possible to define, for both Manta and ManArray approaches that only the 1W case is meaningful for use with the JMPcc, CALLcc, and other conditional branch type instructions. By using the SetCC register and conditional execution with CE3b and CE3c, it will be possible to set the ACFs based upon a logical combination of the packed data ASFs and then use true (T.) or false (F.) forms of the JMP, CALL, and other conditional instructions to accomplish the same task.

For ManArray, the generic ASF is as follows:
Arithmetic Scalar Flags Affected
C=1 if a carry occurs on any packed data operation, 0 otherwise,
N=MSB of result of any packed data operation,
V=1 if an overflow occurs on any packed data operation, 0 otherwise, and
Z=1 if result is zero on any packed data operation, 0 otherwise.

PE Exception Interrupts Alternative

Figure 15:
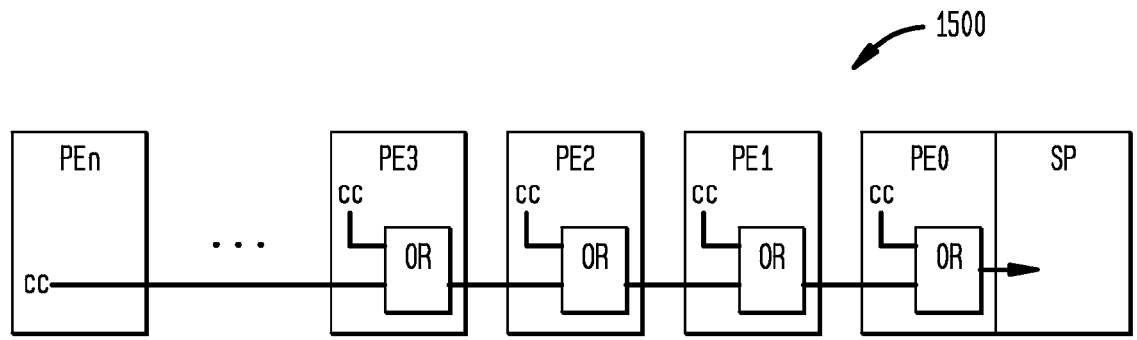
FIG. 15 illustrates an alternative implementation for a PE exception interface to the SP.

Rather than have each PE supply a separate exception wire, an alternative approach is to use a single wire that is daisy-chain ORed as the signal propagates from PE to PE, as shown for PE0-PEn for system 1560 of FIG. 15. In FIG. 15, a single line ORed exception signal and an exemplary signal flow are illustrated where the exception cc is generated in each PE assuming that cc=0 for no exception and cc=1 for an exception. The exception cc is generated every instruction execution cycle as specified by the SetCC register. If multiple PEs cause exceptions at the same time, each exception is handled sequentially until all are handled.

Figure 16:
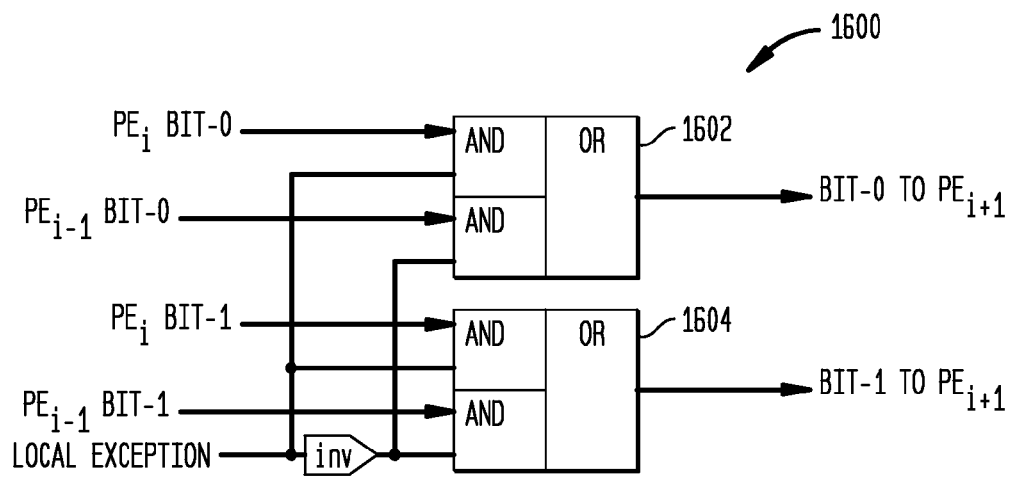
FIG. 16 illustrates an alternative implementation for PE address generation for a PE exception interface to the SP.

The PE addresses are handled in a similar manner as the single exception signal. An additional set of "n" wires for a $2^n$ array supplies the PE address. For example, a 4×4 array would require only five signal lines, four for the address and one for the exception signal. An exemplary functional view of suitable address logic 1600 for each PE in a 2×2 array is shown in FIG. 16. The logic 1600 is implemented using a 2×2 AND-OR, such as AND-ORs 1602 and 1604 per PE address bit.

With this approach, the PE closest to the SP on the chain will block PE exception addresses behind it until the local PE's exception is cleared. It is noted that if each PE can generate multiple exception types and there becomes associated with each type a priority or level of importance, then additional interface signals can be provided between PEs to notify the adjacent PEs that a higher priority exception situation is coming from a PE higher up in the chain. This notification can cause a PE to pass the higher priority signals. In a similar manner, an exception interface can be provided that gives the exception type information along with the PE address and single exception signal. The exception types can be monitored to determine priority levels and whether a PE is to pass a signal to the next PE or not.

Debug Interrupt Processing

Figure 17:
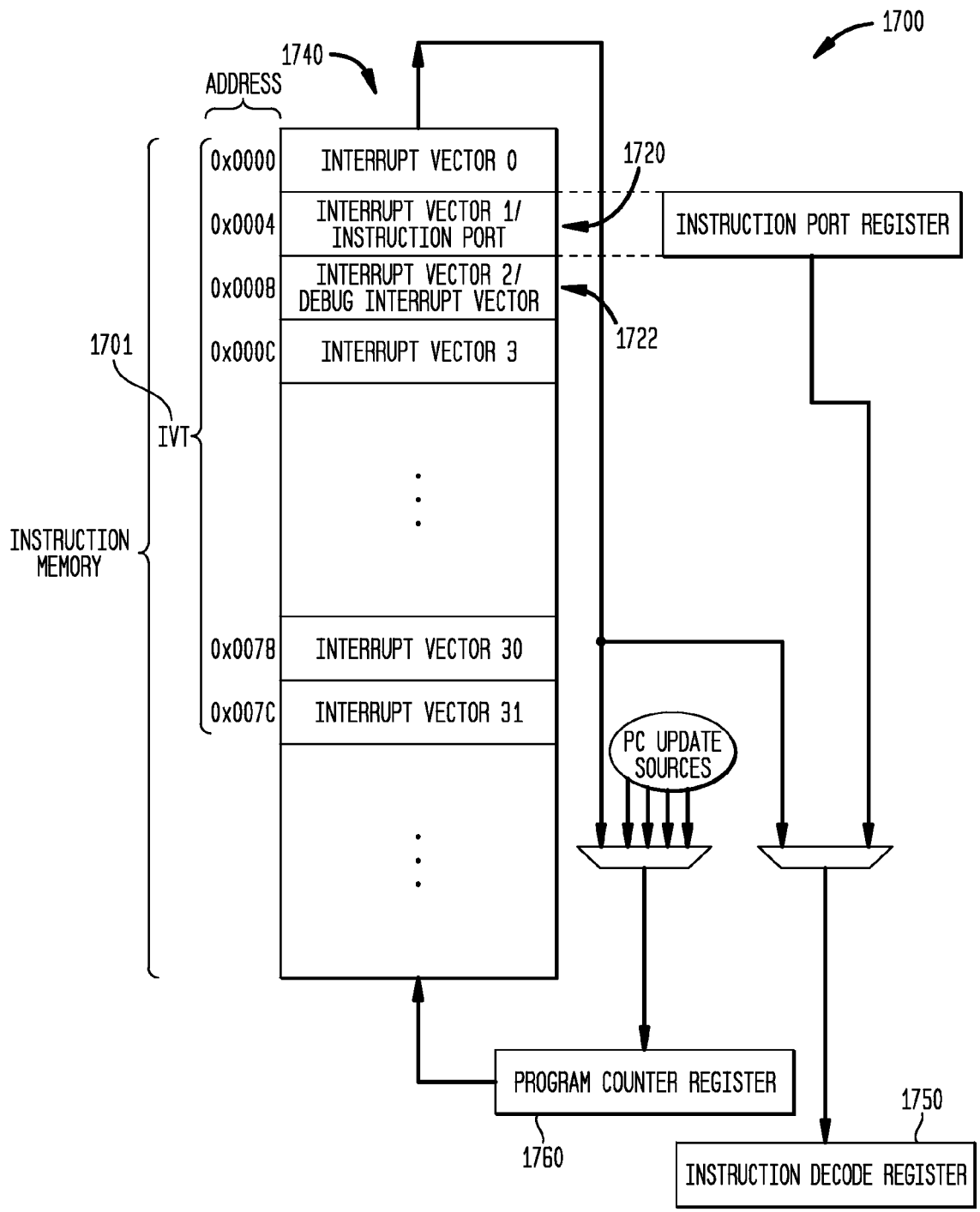
FIG. 17 illustrates aspects of an interrupt vector table for use in conjunction with the present invention.

There is a region of DSP instruction memory called an "interrupt vector table" (IVT) 1701 and shown in FIG. 17 which contains a sequence of instruction addresses. For the exemplary system this table resides at instruction memory address 0x0000 through 0x007F, where each entry is itself the 32-bit (4 byte) address of the first instruction to be fetched after the interrupt control unit accepts an interrupt signal corresponding to the entry. The first entry at instruction memory address 0x0000 (1740) contains the address of the first instruction to fetch after RESET is removed. The third entry at instruction memory address 0x0008 (1722) contains the address of the first instruction to be fetched when a debug interrupt occurs. Debug interrupts have the highest interrupt priority and are accepted at almost any time and cannot be masked. There are a few times at which a debug interrupt is not immediately acknowledged, such as when a load-VLIW (LV) instruction sequence is in progress, but there are few of these cases. There is a special table entry at instruction memory address 0x0004 (1720) in the exemplary system.

This entry has a "shadow" register 1800 associated with it called the Debug Instruction Register (DBIR) shown in FIG. 18. In addition, there are a set of control bits that are used to determine its behavior. Normally, in responding to an interrupt, a value is fetched from the IVT and placed into the program counter (PC) 1760, and it determines where the next instruction will be fetched. If a program branch targets an address in the IVT memory range, then the value fetched would be assumed to be an instruction and placed into the instruction decode register (IDR) 1750. Since the IVT contains addresses and not instructions, this would normally fail. However, in the case of address 0x0004, an instruction fetch targeting this address will cause the processor to attempt to fetch from its "shadow" register, the DBIR (if it is enabled). If there is an instruction in the DBIR, then it is read and placed into the IDR for subsequent decode. If there is not an instruction in the DBIR, the processor stalls immediately, does not advance the instructions in the pipeline, and waits for an instruction to be written to the DBIR. There are three control bits which relate to the DBIR. The debug instruction register enable (DBIREN) bit 1920 of the DSP control register (DSPCTL) 1900 shown in FIG. 19 when set to 1 enables the DBIR "shadow" register. If this bit is 0, then a fetch from 0x0004 will return the data from that instruction memory location with no special side-effects. Two other bits residing in the Debug Status Register (DBSTAT) 2000 of FIG. 20 are the "debug instruction present" (DBIP) bit 2030, and the "debug stall" (DBSTALL) bit 2020. The DBIP bit is set whenever a value is written to the DBIR either from the MCB or from the SPR bus. This bit is cleared whenever an instruction fetch from 0x0004 occurs (not an interrupt vector fetch). When this bit is cleared and an instruction fetch is attempted from 0x0004 then the DBSTALL bit of the DBSTAT register is set and the processor stalls as described above. When this bit is set and an instruction fetch is attempted, the contents of the DBIR are sent to the IDR for decoding and subsequent execution.

When the debug interrupt vector at instruction memory address 0x0008 is loaded with a value of 0x0004, and the DBIREN bit of the DSPCTL register is set to 1 (enabling the DBIR), then when a debug interrupt occurs, 0x0004 is first loaded into the PC (vector load) and the next instruction fetch is attempted at address 0x0004. When this occurs, the processor either stalls (if DBIP=0) or fetches the instruction in the DBIR and executes it. Using this mechanism it is possible to stop the processor pipeline (having saved vital hardware state when the interrupt is accepted) and have an external agent, a test module (or debugger function), take over control of the processor.

As an additional note, on returning from any interrupt, at least one instruction is executed before the next interrupt vector is fetched, even if an interrupt is pending when the return-from-interrupt instruction (RETI) is executed. In the case where a debug interrupt is pending when the RETI instruction is executed, exactly one instruction is executed before fetching from the first address of the debug service routine (or from the DBIR if the vector is programmed to 0x0004). This behavior allows the program to be single-stepped by setting the debug interrupt request bit in the interrupt request register (IRR) while still in the debug interrupt handler. Then when the RETI is executed, a single instruction is executed before reentering the debug interrupt mode.

Figures 22, 23:
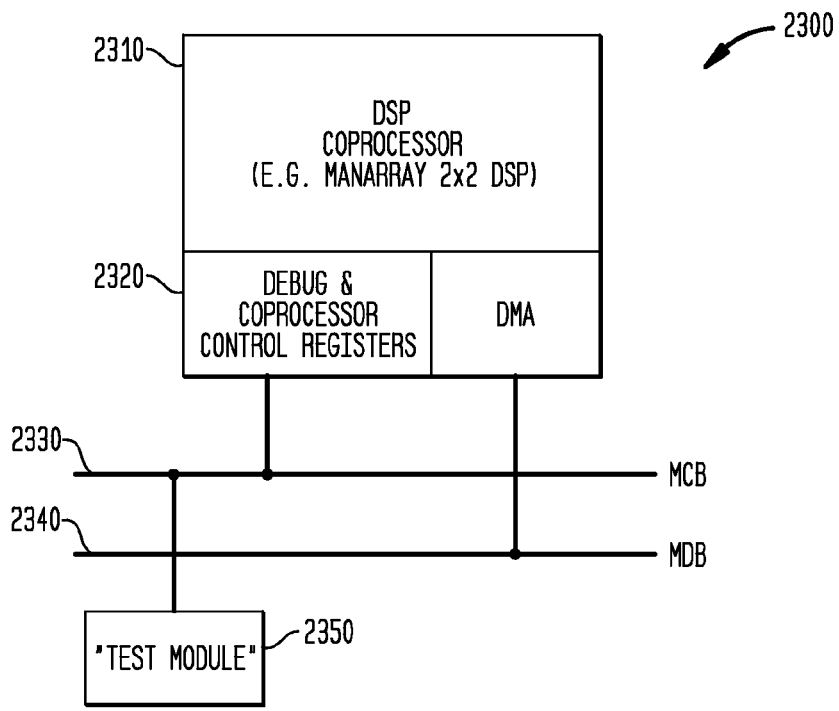

Two additional registers along with two control bits are used during debug processing to allow a debug host or test module to communicate with debug code running in the target processor. The debug-data-out (DBDOUT) register 2100 of FIG. 21 and the debug-data-in (DBDIN) register 2200 of FIG. 22 are used for sending data out from the processor and reading data into the processor respectively. A write to the DBDOUT register causes a status bit, debug data output buffer full bit (DBDOBF) 2040 of the DBSTAT register to be set. This bit also controls a signal which may be routed to an interrupt on an external device (e.g. the test module or debug host). The complement of this signal is routed also to an interrupt on the target processor so that it may use interrupt notification when data has been read from the DBDOUT register. The DBDOUT register is visible to MCB bus masters and when read, the DBDOBF bit to be cleared. An alternate read address is provided which allows the DBDOUT data to be read without clearing the DBDOBF bit. When an external debug host or test module writes to the DBDIN register, the debug data input-buffer-full bit (DBDIBF) 2050 of the DBSTAT register is set. This bit also controls a signal which is routed to an interrupt on the processor target. The complement of this signal is available to be routed back to the debug host or test module as an optional interrupt source. When the target processor reads the DBDIN register, the DBDIBF bit is cleared.

Given the preceeding background, the following discussion describes a typical debug sequence assuming that the debug interrupt vector in the IVT is programmed with a 0x0004 (that is, pointing to the DBIR register) and the DBIR is enabled (DBIREN=1). FIG. 23 illustrates an exemplary DSP ManArray processor 2310 residing on an MCB 2030 and an MDB 234. An external device which we will call the "test module" residing on the MCB, initiates a debug interrupt on the target processor core. The test module is assumed be an MCB bus master supporting simple read and write accesses to slave devices on the bus. The test module actually provides an interface between some standard debug hardware (such as a JTAG port or serial port) and the MCB, and translates read/write requests into the MCB protocol. A debug interrupt may be initiated by writing to a particular MCB address, or configuring an instruction event point register described in further detail in U.S. application Ser. No. 09/598, 566 to cause a debug interrupt when a particular DSP condition occurs such as fetching an instruction from a specified address, or fetching data from a particular address with a particular value.

The processor hardware responds to the interrupt by saving critical processor state, such as the program status and control register, SCR0, and several other internal bits of state. The debug interrupt vector is fetched (having contents 0x0004) into the PC and then the processor attempts to read an instruction from 0x0004 causing an access to the DBIR register. If the DBIP bit of the DBSTAT register is 0, then the processor stalls waiting for an action from the test module. When the processor stalls, the DBSTALL bit of the DBSTAT register is set to 1. This bit is also connected to a signal which may be routed (as an interrupt for example) to the test module. This is useful if an event point register is used to initiate the debug interrupt. Rather than polling the DBSTAT register, the test module may be configured to wait for the DBSTALL signal to be asserted. If the DBIP bit is set to 1, then the processor fetches the value in the DBIR and attempts to execute it as an instruction. Typically, the DBIR does not have an instruction present when the debug interrupt is asserted, allowing the processor to be stopped.

The debugger then reads a segment of the DSP instruction memory via the test module, and saves it in an external storage area. It replaces this segment of user program with a debug monitor program.

The test module then writes a jump-direct (JMPD) instruction to the DBIR. When this occurs the DBIP bit is set, and the processor fetches this instruction into the IDR for decode, after which it is cleared again. The debugger design must make sure that no programmer visible processor state is changed until it has been saved through the test module. This JMPD instruction targets the debug monitor code.

The monitor code is executed in such a way as to retain the program state. The DBDOUT register is used to write data values and processor state out to the test module To resume program execution, the test module writes state information back to the processor using the DBDIN register. When all state has been reloaded, the debug monitor code jumps to instruction address 0x0004 which results in a debug stall.

The test module lastly writes an RETI instruction to the DBIR which causes the internal hardware state to be restored and execution resumed in the program where it was interrupted.

It will be noted that the debug sequence mentioned above could take place in several stages with successive reloads of instructions, using very little instruction memory.

It should also be noted that it is possible to execute the state save/restore sequence by just feeding instructions through the DBIR. Doing this requires that the PC be "locked", that is, prevented from updating by incrementing. This is done using a bit of the DSP control register (DSPCTL) called the "lock PC" (LOCKPC) bit 1930. When this bit is 1, the PC does is not updated as a result of instruction fetch or execution. This means when the LOCKPC bit is 1, branch instructions have no effect, other than updating the state of the user link register (ULR) (for CALL-type instructions). Typically a small amount of instruction memory is used to "inject" a debug monitor program since this allows execution of state save/restore using loop instructions providing a significant performance gain.

If a debug monitor is designed to be always resident in processor memory, when the debug interrupt occurs, it does not need to be directed to the DBIR, but rather to the entry point of the debug monitor code.

Reset of the processor is carried out using the RESETDSP bit 1940 of the DSPCTL register. Setting this bit to 1 puts the processor into a RESET state. Clearing this bit allows the processor to fetch the RESET vector from the IVT into the PC, the fetch the first program instruction from this location. It is possible to enter the debug state immediately from RESET if the value 0x0004 is placed in the reset vector address (0x0000) of the IVT, and the DBIREN bit of the DSPCTL register is set to 1. This results in the first instruction fetch coming from the DBIR register. If no instruction is present then the processor waits for an instruction to be loaded.

While the present invention is disclosed in a presently preferred context, it will be recognized that the teachings of the present invention may be variously embodied consistent with the disclosure and claims. By way of example, the present invention is disclosed in connection with specific aspects of the ManArray architecture. It will be recognized that the present teachings may be adapted to other present and future architectures to which they may be beneficial, or to the ManArray architecture as it evolves in the future.

We claim:

1. A method of operating a pipeline, the method comprising:

initiating execution of a first instruction in parallel with a second instruction in a processor, wherein the first instruction is a one cycle execution instruction and the second instruction is a two cycle execution instruction;

receiving a notification of an interrupt in the processor before completing the execution of the first instruction and before completing the execution of the second instruction;

completing the execution of the first instruction and saving a first execution result in a target register specified by the first instruction;

completing the execution of the second instruction and saving a second execution result in an interrupt forwarding register in response to the notification without saving the second execution result in a target register specified by the second instruction; and restoring the second execution result from the interrupt forwarding register to the target register specified by the second instruction on a return from interrupt.

2. The method of claim 1 further comprising:

fetching the first instruction and the second instruction in parallel from a local instruction storage in the processor to initiate the execution of the first instruction in parallel with execution of the second instruction.

3. The method of claim 1 further comprising:

saving states of flags generated at completion of the execution of the first instruction to a saved status register in response to the notification to be restored to conditional execution flags on the return from interrupt.

4. The method of claim 1 further comprising:

saving flag information generated at completion of the execution of the second instruction to the interrupt forwarding register in response to the notification.

5. The method of claim 4 further comprising:

restoring the flag information from the interrupt forwarding register to conditional execution flags on the return from interrupt.

6. The method of claim 1 further comprising:

saving a result operand register address specified by the second instruction in the interrupt forwarding register in response to the notification; and restoring the second execution result from the interrupt forwarding register to the target register at the result operand register address specified by the second instruction on the return from interrupt.

7. A method of operating a pipeline in a parallel array processor having a first processing element (PE) and a second PE, the method comprising:

initiating execution of a first instruction in a first PE in parallel with initiating execution of a second instruction in a second PE, wherein the first instruction is a one cycle execution instruction and the second instruction is a two cycle execution instruction;

receiving a notification of an interrupt in the first PE and in parallel in the second PE before completing the execution of the first instruction in the first PE and before completing the execution of the second instruction in the second PE;

completing the execution of the first instruction in the first PE and saving a first execution result in a target register specified by the first instruction;

completing the execution of the second instruction in the second PE and saving a second execution result in an interrupt forwarding register in response to the notification without saving the second execution result in a target register specified by the second instruction; and restoring the second execution result from the interrupt forwarding register to the target register specified by the second instruction in the second PE on a return from interrupt.

8. The method of claim 7, wherein a sequence processor (SP) controls the parallel array processor by causing the first PE and the second PE to fetch instructions from instruction storage on each PE for execution of said fetched instructions in each PE.

9. The method of claim 8, wherein the SP acknowledges the interrupt and notifies the first PE and the second PE of the interrupt.

10. The method of claim 7, further comprising:

dispatching a very long instruction word (VLIW) instruction by a sequence processor (SP) to both the first PE and the second PE to initiate fetching the first instruction in the first PE and in parallel fetching the second instruction in the second PE; and receiving the first instruction in the first PE and in parallel receiving the second instruction in the second PE, wherein the reception of the first instruction initiates execution of the first instruction in the first PE and reception of the second instruction initiates execution of the second instruction in the second PE.

11. The method of claim 10 further comprising:

receiving an interrupt in the SP; and sending the notification of the interrupt to the first PE and in parallel sending the notification of the interrupt to the second PE.

12. The method of claim 7 further comprising:

fetching the first instruction from a first local instruction storage in the first PE to initiate the execution of the first instruction in the first PE; and fetching the second instruction from a second local instruction storage in the second PE to initiate the execution of the second instruction in the second PE.

13. The method of claim 7 further comprising:

saving states of flags generated at completion of the execution of the first instruction to a saved status register in the first PE.

14. The method of claim 7 further comprising:

saving flag information generated at completion of the execution of the second instruction to the interrupt forwarding register in response to the notification in the second PE.

15. The method of claim 14 further comprising:

restoring the flag information from the interrupt forwarding register to conditional execution flags in the second PE on the return from interrupt.

16. The method of claim 7 further comprising:

saving a result operand register address specified by the second instruction in interrupt forwarding registers in response to the notification; and restoring the second execution result from the interrupt forwarding registers to the target register at the result operand register address specified by the second instruction in the second PE on the return from interrupt.

17. A very long instruction word (VLIW) processing element (PE) comprising:

a PE control unit initiating execution of a VLIW received in the PE, wherein the VLIW contains a first instruction that takes a single cycle to execute and a second instruction that takes two cycles to execute;

a PE pipeline configurable in response to a notification of an interrupt, the notification received while the PE is executing the first instruction in parallel with the second instruction;

a register file having individual registers specified by instructions in a program;

a single cycle execution unit which executes the first instruction and upon completing execution of the first instruction, saves a first execution result to a target register located in the register file and specified by the first instruction;

an interrupt forwarding register for storing execution results after the notification is received;

a two cycle execution unit which executes the second instruction and upon completing execution of the second instruction, saves a second execution result in the interrupt forwarding register in response to the notification without saving the second execution result in a target register located in the register file and specified by the second instruction; and a restoring function which restores the second execution result from the interrupt forwarding register to the target register specified by the second instruction on a return from interrupt.

18. The VLIW processor of claim 17 further comprising:

saving state of flags generated at completion of the execution of the first instruction to a saved status register in response to the notification, the state of flags restored from the saved status register to conditional execution flags on the return from interrupt.

19. The method of claim 17 further comprising:

saving flag information generated at completion of the execution of the second instruction to the interrupt forwarding register in response to the notification.

20. The method of claim 19 further comprising:

restoring the flag information from the interrupt forwarding register to conditional execution flags on the return from interrupt.

* * * * *